(12) United States Patent
Toyoda

(10) Patent No.: US 6,208,450 B1
(45) Date of Patent: Mar. 27, 2001

(54) SCANNING OPTICAL DEVICE

(75) Inventor: Koji Toyoda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/334,563

(22) Filed: Jun. 21, 1999

(30) Foreign Application Priority Data

Jun. 23, 1998 (JP) .................................... 10-192448
May 26, 1999 (JP) .................................... 11-146227

(51) Int. Cl.$^7$ .................................................. G02B 26/08
(52) U.S. Cl. .......................... 359/205; 359/206; 359/207; 359/212; 359/216
(58) Field of Search .................................. 359/205–207, 359/17–18, 565, 212, 216–219; 235/457

(56) References Cited

U.S. PATENT DOCUMENTS 5,859,715 * 1/1999 Meyers et al. ........................... 359/17

6,038,053 * 3/2000 Kato ...................................... 359/205

FOREIGN PATENT DOCUMENTS 8-122635  5/1996 (JP) .
8-248308  9/1996 (JP) .

\* cited by examiner

*Primary Examiner*—James Phan
(74) *Attorney, Agent, or Firm*—Fitzpatrick, Cella, Harper & Scinto

(57) ABSTRACT

In a scanning optical device, a light beam emitted from a light source is deflected by a deflector to reach as a light spot a surface to be scanned through a scanning optical system. At least one of the optical surfaces of optical elements constituting the scanning optical system is provided with a diffraction grating having a power based on a change in pitch. The power of the diffraction grating asymmetrically changes within a plane of the optical element surface, on which the diffraction grating is formed, without any symmetrical axis, in at least one of a main scanning direction and sub-scanning direction.

20 Claims, 23 Drawing Sheets

DIFFRACTION POWER IN MAIN SCANNING DIRECTION

AFFIX "u": AT LASER SIDE
AFFIX "l": AT SIDE OPPOSITE TO LASER

DIFFRACTION POWER IN SUB SCANNING DIRECTION

AFFIX "u": AT LASER SIDE
AFFIX "l": AT SIDE OPPOSITE TO LASER

DIFFRACTION POWER IN MAIN SCANNING DIRECTION

AFFIX "u": AT LASER SIDE
AFFIX "l": AT SIDE OPPOSITE TO LASER

DIFFRACTION POWER IN SUB SCANNING DIRECTION

AFFIX "u": AT LASER SIDE
AFFIX "l": AT SIDE OPPOSITE TO LASER

AFFIX "u": AT LASER SIDE
AFFIX "l": AT SIDE OPPOSITE TO LASER

AFFIX "u": AT LASER SIDE
AFFIX "l": AT SIDE OPPOSITE TO LASER

CONFIGURATION OF TORIC SURFACE IN MAIN SCANNING SECTION

AFFIX "u": AT LASER SIDE
AFFIX "l": AT SIDE OPPOSITE TO LASER

RADIUS OF CURVATURE OF TORIC SURFACE IN SUB SCANNING DIRECTION

AFFIX "u": AT LASER SIDE
AFFIX "l": AT SIDE OPPOSITE TO LASER

SCANNING OPTICAL DEVICE

BACKGROUND OF THE INVENTION

1. Field of the Invention

The present invention relates to a scanning optical device and, more particularly, to a scanning optical device suitably used for image forming apparatuses such as a laser beam printer and digital copying machine, in which a light beam emitted from a light source means is guided onto a scanned surface as a recording medium surface through a light deflector such as a rotating polygon mirror, and the light beam is scanned on the scanned surface, thereby recording characters, information, and the like.

2. Related Background Art

In a conventional scanning optical device used for a laser beam printer, a digital copying machine, and the like, a light beam emitted from a light source means is deflected by a deflection means, and the deflected light beam forms a spot on a photosensitive drum surface as a scanned surface via a scanning optical means, thereby scanning the light beam on the scanned surface.

FIG. 1 is a schematic view of the main part of a conventional scanning optical device. Referring to FIG. 1, a light beam emitted from a light source means 11 constituted by a semiconductor laser and the like is converted into a substantially collimated light beam by a collimator lens 12. This substantially collimated light beam is shaped into an optimal beam shape by an aperture stop 13 and strikes a cylindrical lens 14. The cylindrical lens 14 has a power in the sub-scanning direction and forms a light beam image elongated in the main scanning direction near a deflection surface 15a of the light deflector 15 constituted by a rotating polygon mirror and the like. In this case, the main scanning direction is a direction perpendicular to the deflection scanning direction, and the sub-scanning direction is a direction perpendicular to the deflection scanning direction. This applies to the following description. The light beam is reflected/deflected by the light deflector 15 at an equal angular velocity to form a spot on a photosensitive drum surface (recording medium surface) 18 as a scanned surface via an fθ lens 16 which is a single element lens serving as a scanning optical means having an fθ characteristic. This light beam is scanned on the photosensitive drum surface 18 at an equal velocity.

In a scanning optical device of this type, a rotating polygon mirror having many deflection surfaces (reflection surfaces) is generally used as a deflection means, and an optical axis is set at a given angle before and after deflection in the overall scanning optical system. That is, a light beam emitted from a light source means is obliquely incident on the deflection means within a scanning plane. For this reason, deflection surfaces asymmetrically enter and exit within one scanning operation with reference to on-axis scanning. The influences of this asymmetry are noticeable in a sub-scanning cross-section in which a light beam is temporarily imaged near the deflection surface to set the deflection surface and the scanned surface conjugate with each other. This makes it difficult to correct curvature of field.

To realize a scanning optical device with a higher resolution (smaller spot), the influences of asymmetry on curvature of field and fθ characteristics in the main scanning direction must be considered. As a means for solving these problems, for example, the scanning optical devices disclosed in Japanese Laid-Open Patent Application Nos. 8-122635 and 8-248308 use a means for asymmetrically changing this radius of curvature in the sub-scanning direction with respect to the optical axis. This allows proper correction of curvature of field in the sub-scanning direction throughout the entire scanning width. A lens having such a shape is generally manufactured by plastic molding in consideration of technical and economical advantages.

As is known, however, plastic materials are susceptible to environmental variations. With a change in ambient temperature, in particular, the refractive index of a plastic material changes. As a consequence, the focal point of the plastic lens varies, and for example, the spot size on a scanned surface increases. This makes it difficult to obtain a high-quality printed image.

SUMMARY OF THE INVENTION

It is the first object of the present invention to provide a compact scanning optical device which can properly correct the optical characteristics (curvature of field and the like) by forming a diffraction grating on at least one surface of the optical surfaces of optical elements constituting a scanning optical means and asymmetrically changing the power of the diffraction grating without any symmetrical axis in at least the main scanning direction or sub-scanning direction, is resistant to focus changes due to environmental variations (temperature changes), and is capable of high-resolution printing with a simple arrangement.

It is the second object of the present invention to provide a compact scanning optical device which can properly correct the optical characteristics (curvature of field and the like) by forming a diffraction grating on at least one surface of the optical surfaces of optical elements constituting a scanning optical means, asymmetrically changing the pitch of the diffraction grating without any symmetrical axis in at least the main scanning direction or sub-scanning direction, and also asymmetrically changing the shape of at least one surface of the optical surfaces of the optical elements constituting the scanning optical means from an on-axis position to an off-axis position in at least the main scanning direction or the sub-scanning direction, is resistant to focus changes due to environmental variations (temperature changes), and is capable of high-resolution printing with a simple arrangement.

A scanning optical device of the present invention for guiding a light beam emitted from light source means to deflection means, causing scanning optical means to form a spot of the light beam deflected by the deflection means on a scanned surface, and scanning the light beam on a scanned surface, is characterized in that a diffraction grating having a power based on a change in pitch is formed on at least one of optical surfaces of optical elements constituting the scanning optical means, and the power of the diffraction grating asymmetrically changes within a plane of the optical element surface, on which the diffraction grating is formed, without any symmetrical axis, in at least one of a main scanning direction and sub-scanning direction.

The present invention is characterized in that the power of the diffraction grating in the main scanning direction asymmetrically changes from an on-axis position to an off-axis position with respect to a reference axis.

The present invention is characterized in that the power of the diffraction grating in the sub-scanning direction asymmetrically changes from an on-axis position to an off-axis position with respect to a reference axis in the main scanning direction, and a power Po on the on-axis position and a power Py on the off-axis position both with respect to the reference axis satisfy Po>Py The present invention is characterized in that both the powers of the diffraction grating in the main scanning direction and sub-scanning direction asymmetrically change from an on-axis position to an off-axis position with respect to a reference axis, and the power in the sub-scanning direction satisfies Po>Py where Po is a power on the on-axis position and Py is a power on the off-axis position both with respect to the reference axis.

The present invention is characterized in that the scanning optical means corrects a focus shift in at least one of the main scanning direction and sub-scanning direction, which is caused by a change in refractive index of a lens material due to an environmental variation in the device, by using a diffraction power change caused by a wavelength variation in the light source means.

The present invention is characterized in that the optical element on which the diffraction grating is formed is made of a plastic material.

The present invention is characterized in that the reference axis is an optical axis.

The present invention is characterized in that the scanning optical device is used for an image forming apparatus for forming an image by using a deflected/scanned light beam.

A scanning optical device of the present invention for guiding a light beam emitted from light source means to deflection means, causing scanning optical means to form a spot of the light beam deflected by the deflection means on a scanned surface, and scanning the light beam on a scanned surface, is characterized in that a diffraction grating is formed on at least one of optical surfaces of optical elements constituting the scanning optical means, a pitch of the diffraction grating changes without any symmetrical axis in at least one of a main scanning direction and sub-scanning direction, and at least one of the optical surfaces of the optical elements constituting the scanning optical means is asymmetrically shaped from an on-axis position to an off-axis position in at least one of the main scanning direction and sub-scanning direction.

The present invention is characterized in that the power of the diffraction grating in the main scanning direction asymmetrically changes from an on-axis position to an off-axis position with respect to a reference axis.

The present invention is characterized in that the power of the diffraction grating in the sub-scanning direction asymmetrically changes from an on-axis position to an off-axis position with respect to a reference axis in the main scanning direction, and a power Po on the on-axis position and a power Py on the off-axis position both with respect to the reference axis satisfy Po>Py The present invention is characterized in that both the powers of the diffraction grating in the main scanning direction and sub-scanning direction asymmetrically change from an on-axis position to an off-axis position with respect to a reference axis, and the power in the sub-scanning direction satisfies Po>Py where Po is a power on the on-axis position and Py is a power on the off-axis position both with respect to the reference axis.

The present invention is characterized in that a power of the optical element having the asymmetrically shaped optical surface in the main scanning direction asymmetrically changes from an on-axis position to an off-axis position.

The present invention is characterized in that a power of the optical element having the asymmetrically shaped optical surface in the sub-scanning direction asymmetrically changes from an on-axis position to an off-axis position in the main scanning direction.

The present invention is characterized in that both powers of the optical element having the asymmetrically shaped optical surface in the main scanning direction and sub-scanning direction asymmetrically change from an on-axis position to an off-axis position.

The present invention is characterized in that the scanning optical means corrects a focus shift in at least one of the main scanning direction and sub-scanning direction, which is caused by a change in refractive index of a lens material due to an environmental variation in the device, by using a diffraction power change caused by a wavelength variation in the light source means.

The present invention is characterized in that the diffraction grating is formed on at least one surface of the optical element having the asymmetrically shaped optical surface.

The present invention is characterized in that the optical element on which the diffraction grating is formed is made of a plastic material.

The present invention is characterized in that the reference axis is an optical axis.

DETAILED DESCRIPTION OF THE PREFERRED EMBODIMENTS

Figure 1:
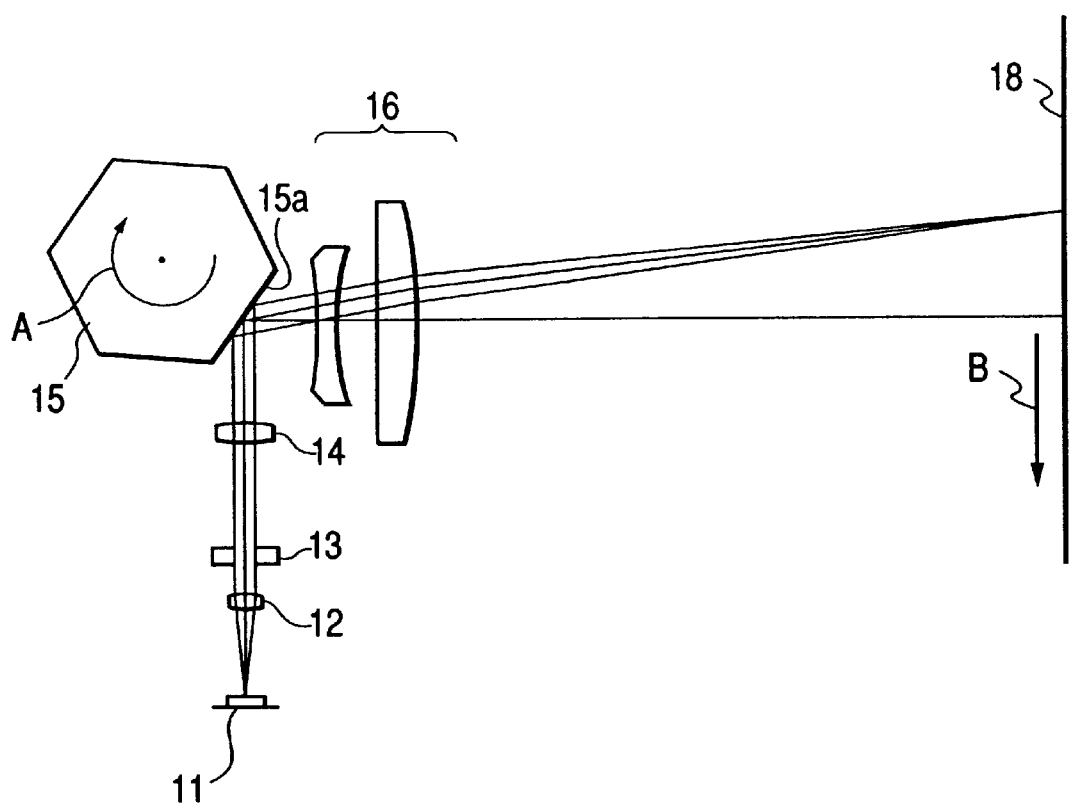
FIG. 1 is a sectional view (main scanning cross-section) of the main part of a conventional scanning optical device in the main scanning direction.
Figure 2:
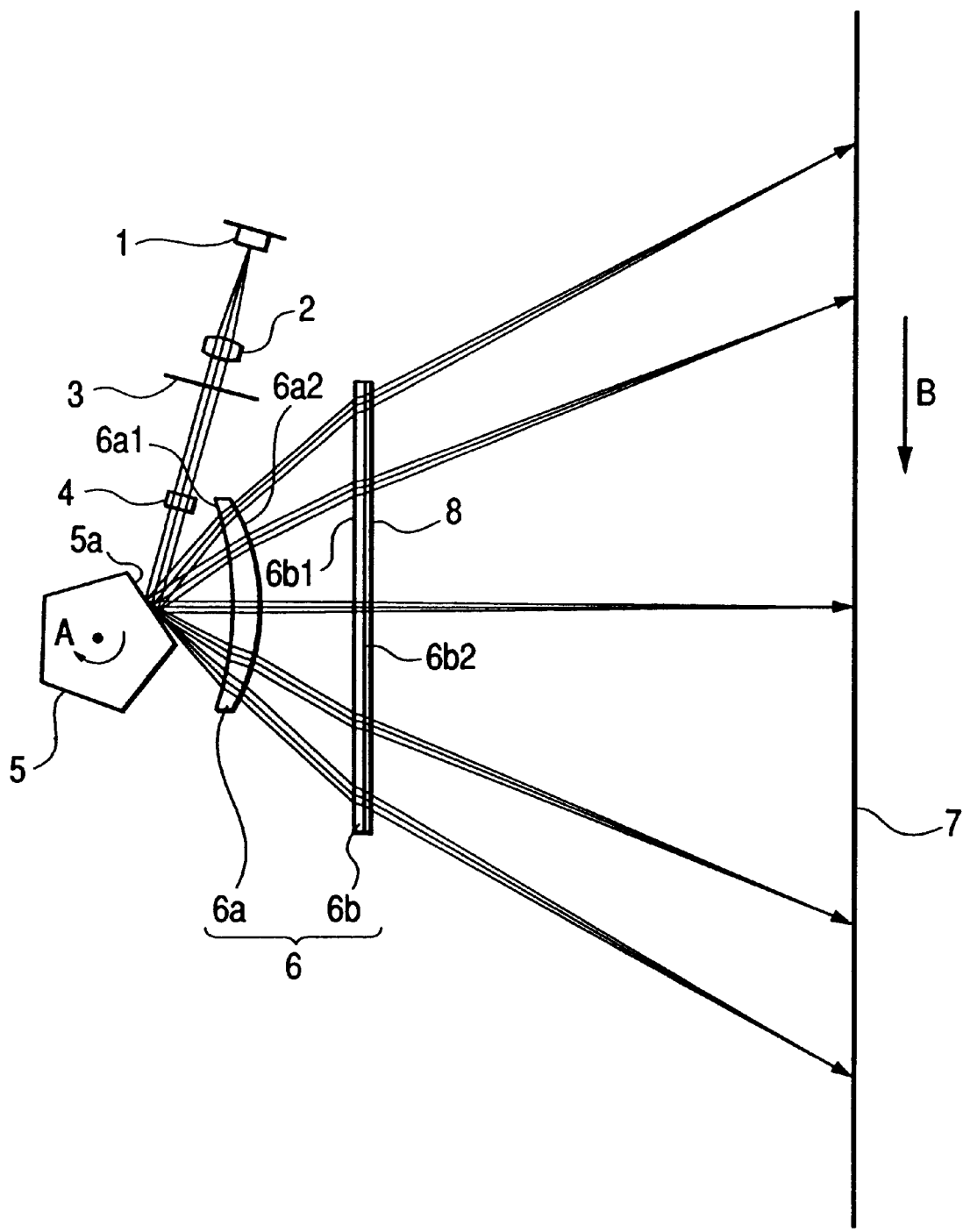
FIG. 2 is a sectional view (main scanning cross-section) of the main part of the first embodiment of the present invention in the main scanning direction.

FIG. 2 is a sectional view (main scanning sectional view) of the main part of a scanning optical device according to the first embodiment of the present invention in the main scanning direction.

Referring to FIG. 2, as a light source means 1, for example, a semiconductor laser is used. A collimator lens 2 converts a divergent light beam emitted from the light source means 1 into a convergent light beam. An aperture stop 3 forms the light beam emerging from the collimator lens 2 into a desired optimal beam shape. A cylindrical lens 4 has a predetermined power in the sub-scanning direction perpendicular to the page and forms the light beam emerging from the aperture stop 3 into an image (a line image elongated in the main scanning cross-section) within the sub-scanning cross-section near a position above a deflection surface 5a of a deflection means 5 (to be described later). The deflection means 5 serves as a light deflector. For example, as the deflection means 5, a rotating polygonal mirror is used, which is rotated by a driving means (not shown) such as a motor at a constant speed in the direction indicated by an arrow A.

A scanning optical means 6 has fθ characteristics and a first optical element (fθ lens system) 6a formed from a refraction system, and a second optical element (fθ lens system) 6b formed from a diffraction system. The first optical element 6a formed from a refraction system is made of an anamorphic lens having different positive (convex) powers in the main scanning direction and sub-scanning directions. The lens has a first surface (incident surface) 6a1 which is a spherical surface, and a second surface (exit surface) 6a2 which is a toric surface. The second surface 6a2 is formed to be aspherical in the main scanning direction and have constant radius of curvature regardless of distance from the optical axis. The second optical element 6b formed from a diffraction system is made of a transparent plate that is flat in both the main scanning direction and sub-scanning direction. A diffraction grating 8 having powers based on changes in pitch is formed on a second surface 6b2 such that the powers based on the diffraction system become different positive (convex) powers in the main scanning direction and sub-scanning direction. The powers based on this diffraction asymmetrically change from an on-axis position to an off-axis position with respect to the reference axis without having any symmetrical axis in both the main scanning direction and sub-scanning direction. Both the first and second optical elements 6a and 6b are made of a plastic material. The scanning optical means 6 has a tilt correction function implemented by setting the deflection surface 5a and a scanned surface 7 conjugate with each other within the sub-scanning cross-section. The scanned surface 7 is a photosensitive drum surface.

Note that the reference axis means the optical axis in this specification.

More specifically, the reference axis coincides with the Y-axis in equation (2) representing a phase function of the diffraction system to be described later.

In this embodiment, the divergent light beam emitted from the light source means 1 is converted into a convergent light beam by the collimator lens 2. The light beam is then shaped into a desired beam shape by the aperture stop 3 and strikes the cylindrical lens 4. The light beam incident on the cylindrical lens 4 exits without any change within the main scanning cross-section. On the other hand, the light beam converges within the sub-scanning cross-section to form a substantially line image (a line image elongated in the main scanning direction) on the deflection surface 5a of the deflection means 5. The light beam reflected/deflected by the deflection surface 5a of the deflection means 5 forms a spot on the photosensitive drum surface 7 via the scanning optical means 6. By rotating the deflection means 5 in the direction indicated by the arrow A, this light beam is scanned on the photosensitive drum surface 7 at a constant speed in the direction indicated by an arrow B (main scanning direction). With this operation, an image is recorded on the photosensitive drum surface 7 as a recording medium.

The shapes of the refraction and diffraction systems of the first and second optical elements 6a and 6b forming the scanning optical means 6 in this embodiment can be respectively expressed as follows, provided that the intersection between each optical element surface and the optical axis or reference axis is regarded as an origin, and the optical axis or reference axis direction, the direction perpendicular to the optical axis or reference axis within the main scanning cross-section, and the direction perpendicular to the optical axis or reference axis within the sub-scanning cross-section respectively correspond to the X-axis, the Y-axis, and the Z-axis.

(1) The refraction system in the main scanning direction: an aspherical shape expressed by a function up to a 10th-order function:

$$X = \frac{Y^2/R}{1+(1-(1+K)(Y/R)^2)^{1/2}} + B_4Y^4 + B_6Y^6 + B_8Y^8 + B_{10}Y^{10}$$

where R is the radius of curvature, and k, $B_4$, $B_6$, $B_8$, and $B_{10}$ are aspherical coefficients (when subscript "u" is attached to a coefficient, it indicates the laser side with respect to the optical axis, whereas when subscript "1" is attached to a coefficient, it indicates the opposite side to the laser side with respect to the optical axis)

in the sub-scanning direction: a spherical shape whose radius of curvature continuously changes in the Y-axis direction:

$$r' = r(1 + D_2Y^2 + D_4Y^4 + D_6Y^6 + D_8Y^8 + D_{10}Y^{10})$$

where r is the radius of curvature, and $D_2$, $D_4$, $D_6$, $D_8$, and $D_{10}$ are aspherical coefficients (when subscript "u" is attached to a coefficient, it indicates the laser side with respect to the optical axis, whereas when subscript "1" is attached to a coefficient, it indicates the opposite side to the laser side with respect to the optical axis).

(2) The diffraction system: a diffraction surface expressed by a phase function of power polynomial up to a 10th-order polynomial in Y and Z:

$$W = C_1Y + C_2Y^2 + C_3Y^3 + C_4Y^4 + C_5Y^5 + C_6Y^6$$
$$+ C_7Y^7 + C_8Y^8 + C_9Y^9 + C_{10}Y^{10}$$
$$+ E_1Z^2 + E_2YZ^2 + E_3Y^2Z^2 + E_4Y^3Z^2 + E_5Y^4Z^2$$
$$+ E_6Y^5Z^2 + E_7Y^6Z^2 + E_8Y^7Z^2 + E_9Y^8Z^2$$

where $C_1$ to $C_{10}$ and $E_1$ to $E_9$ are phase coefficients.

Table-1 shows an optical configuration in the first embodiment. Table-2 shows the aspherical coefficients of the refraction system and the phase coefficients of the diffraction system.

In this case, $\theta_1$ represents the angle defined by the optical axes of the optical system located before and after the deflection means; $\theta$max, the angle defined by a light beam and the optical axis of the scanning optical means when the light beam scans the outermost off-axis position; f, the constant provided with Y=f$\theta$ where Y is the image height and $\theta$ is the scanning angle.

TABLE 1

| Wavelength Used | λ(nm) | 780 |
|---|---|---|
| Refractive Index of First Optical Element | n1 | 1.5242 |
| Refractive Index of Second Optical Element | n2 | 1.5242 |
| Angle Defined by Optical Axes of Optical System Before and After Deflection Means | θ1 (deg) | 75 |

TABLE 1-continued

| Wavelength Used | λ(nm) | 780 |
|---|---|---|
| One-side Maximum Scanning Angle | θ max (deg) | 48 |
| Distance between Deflection Surface and First Optical Element | d1 (mm) | 17.96 |
| Central Thickness of First Optical Element | d2 (mm) | 5.99 |
| Distance between First and Second Optical Elements | d3 (mm) | 23.27 |
| Central thickness of Second Optical Element | d4 (mm) | 2.00 |
| Distance between Second Optical Element and Scanned Surface | d5 (mm) | 115.02 |
| fθ Coefficient | f | 128 |
| Deflection Means (Rotating Polygonal Mirror) | | φ30, 5 surfaces |

TABLE 2

| | Shape of Refraction System | | | |
|---|---|---|---|---|
| | First Optical Element | | Second Optical Element | |
| | First Surface | Second Surface | First Surface | Second Surface |
| R | −76.02769 | −44.54233 | ∞ | ∞ |
| K | 0 | −1.47502E+00 | 0 | 0 |
| B4 | 0 | 9.75346E−07 | 0 | 0 |
| B6 | 0 | −2.71489E−09 | 0 | 0 |
| B8 | 0 | 0.00000E+00 | 0 | 0 |
| B10 | 0 | 0.00000E+00 | 0 | 0 |
| r | −76.02769 | −13.48760 | ∞ | ∞ |
| D2 | 0 | 0.00000E+00 | 0 | 0 |
| D4 | 0 | 0.00000E+00 | 0 | 0 |
| D6 | 0 | 0.00000E+00 | 0 | 0 |
| D8 | 0 | 0.00000E+00 | 0 | 0 |
| D10 | 0 | 0.00000E+00 | 0 | 0 |
| C1 | 0 | 0 | 0 | 0.00000E+00 |
| C2 | 0 | 0 | 0 | −1.46061E−03 |
| C3 | 0 | 0 | 0 | 5.53243E−07 |
| C4 | 0 | 0 | 0 | −5.10506E−07 |
| C5 | 0 | 0 | 0 | −2.86979E−10 |
| C6 | 0 | 0 | 0 | 2.41742E−10 |
| C7 | 0 | 0 | 0 | 5.43721E−14 |
| C8 | 0 | 0 | 0 | −6.16550E−14 |
| C9 | 0 | 0 | 0 | 0.00000E+00 |
| C10 | 0 | 0 | 0 | 6.87310E−18 |
| E1 | 0 | 0 | 0 | −7.58992E−03 |
| E2 | 0 | 0 | 0 | 0.00000E+00 |
| E3 | 0 | 0 | 0 | 1.68251E−06 |
| E4 | 0 | 0 | 0 | −1.24447E−08 |
| E5 | 0 | 0 | 0 | −3.74903E−10 |
| E6 | 0 | 0 | 0 | 8.86316E−12 |
| E7 | 0 | 0 | 0 | 4.17989E−14 |
| E8 | 0 | 0 | 0 | −2.07857E−15 |
| E9 | 0 | 0 | 0 | 0.00000E+00 |

Figure 3:
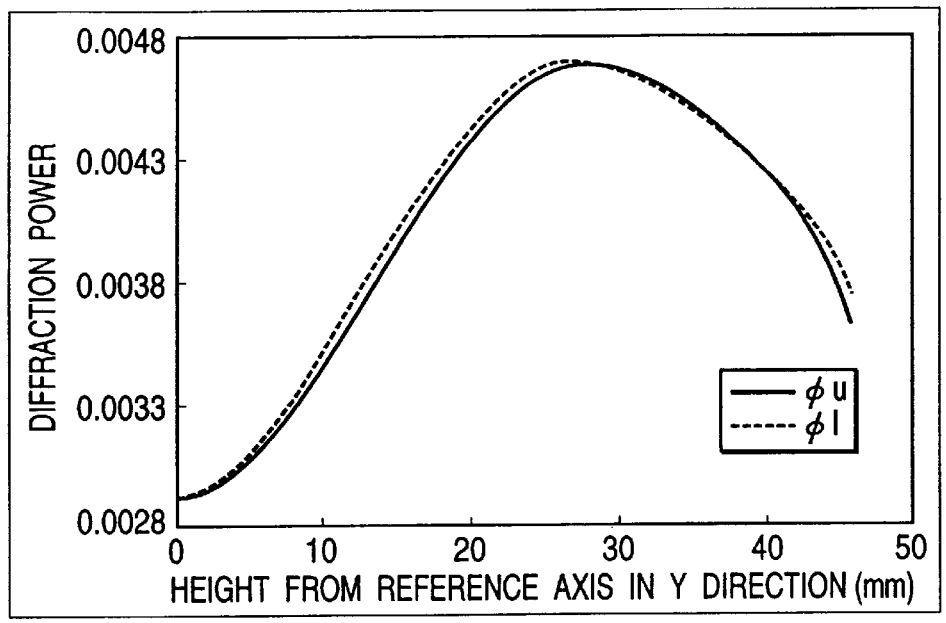
FIG. 3 is a graph showing how the diffraction power in the main scanning direction changes in the first embodiment of the present invention.
Figure 4:
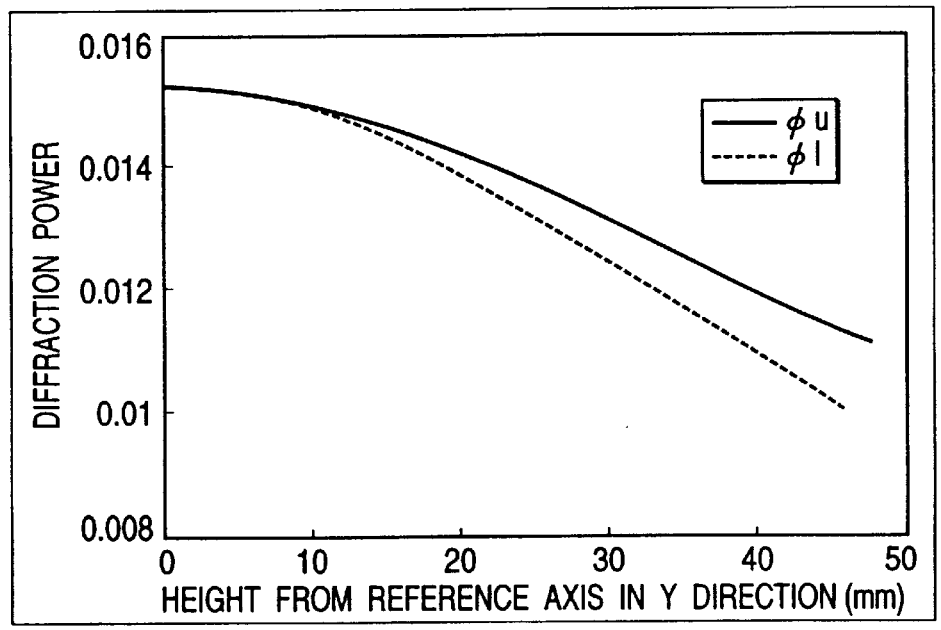
FIG. 4 is a graph showing how the diffraction power in the sub-scanning direction changes in the first embodiment of the present invention.

FIG. 3 shows how the diffraction power of the second optical element 6b in this embodiment changes in the main scanning direction. FIG. 4 shows how the diffraction power changes in the sub-scanning direction. By changing the pitch of the diffraction grating depending on a position, a light beam passing through the corresponding point can be made to converge or diverge. Letting P(y) be the grating pitch at a light beam passing point y, a grating spatial frequency H(y) at the light beam passing point is expressed as:

$$H(y) = 1/P(y)$$

A power φ based on the diffraction grating is given by $$\phi = m\lambda \cdot dH/dy$$

where m is the order and λ is the wavelength.

In this embodiment, the powers based on the diffraction asymmetrically change from an on-axis position to an off-axis position with respect to the reference axis in both the main scanning direction and sub-scanning direction. In the sub-scanning direction, a power Po on the on-axis position and a power Py on the off-axis position both with respect to the reference axis satisfy $$Po > Py \qquad (1)$$

If these powers do not satisfy inequality (1), the curvature of field is difficult to correct, and the sub-scanning magnification cannot be kept uniform. In this embodiment, the optical axis of the first optical element 6a coincides with the reference axis of the second optical element 6b, and shifts from the optical axis of the total system toward the side opposite to the laser by 0.9 mm.

In addition, in the scanning optical means 6 in this embodiment, focus shifts in the main scanning direction and sub-scanning direction, which are traced back to changes in the refractive index of the lens material due to environmental variations, are corrected by changes in the diffraction power of the second optical element 6b owing to variations in the wavelength of the semiconductor laser 1.

Figure 5:
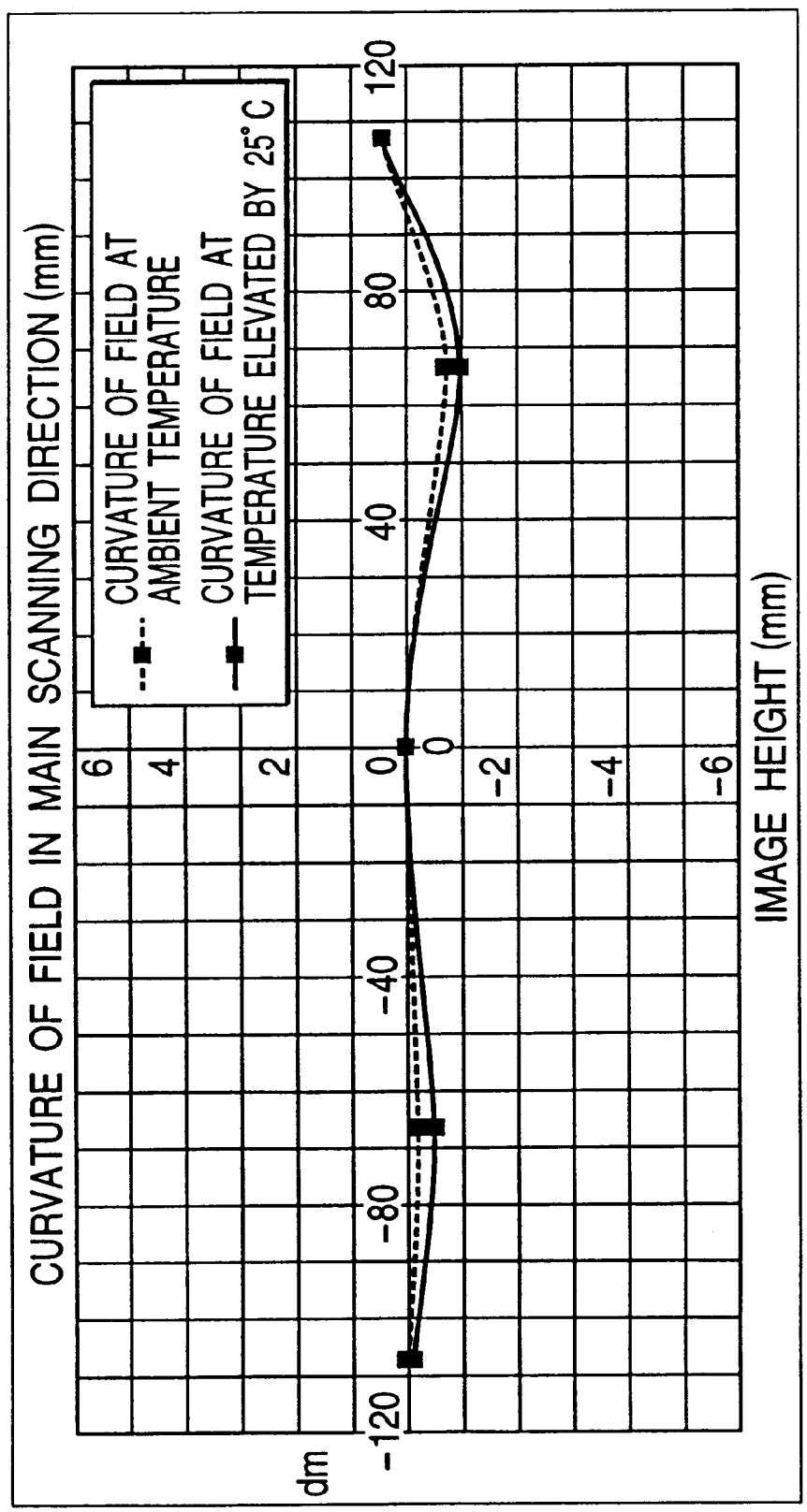
FIG. 5 is a graph showing the curvature of field in the main scanning direction before and after a rise in temperature in the first embodiment of the present invention.
Figure 6:
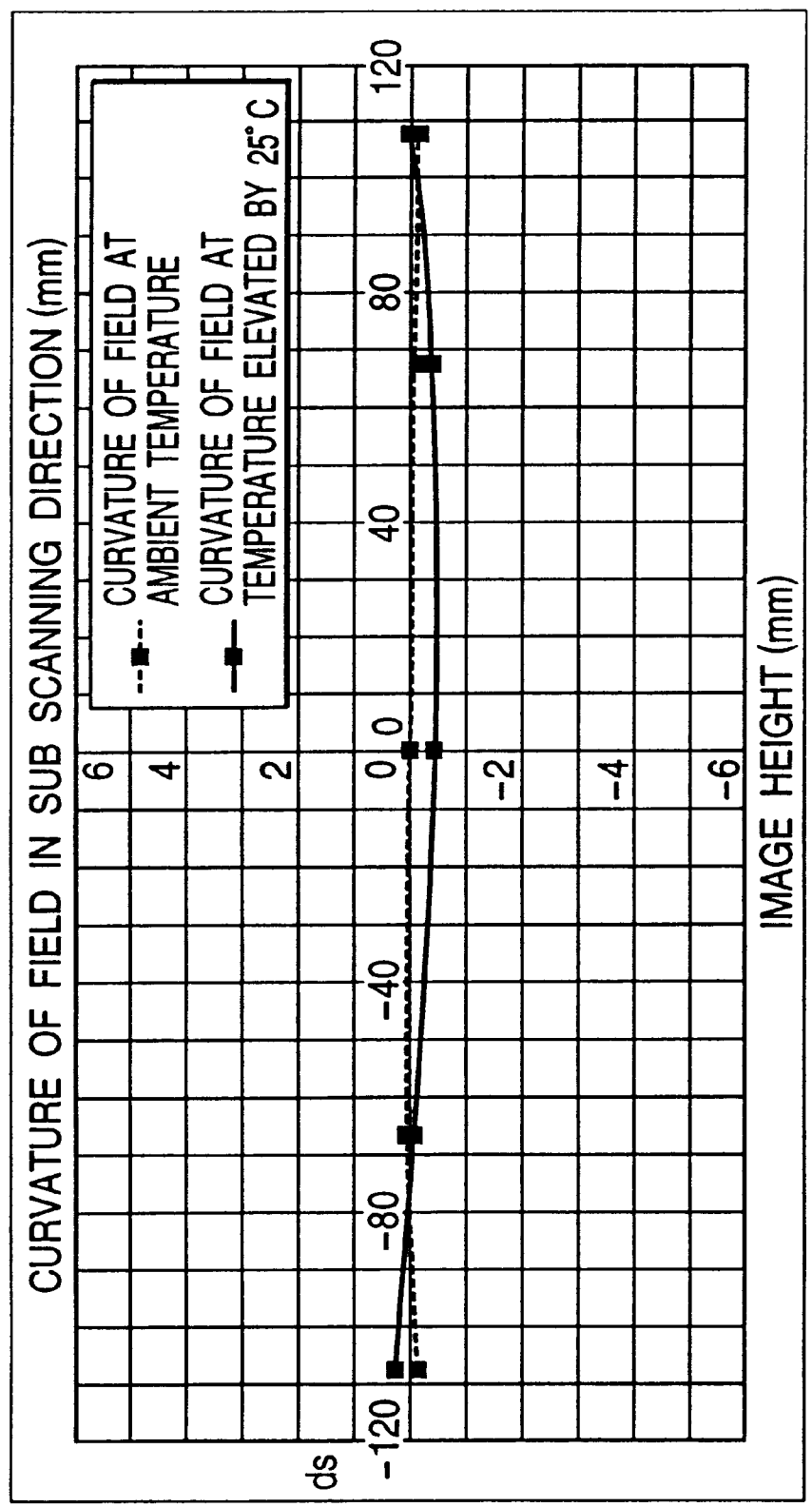
FIG. 6 is a graph showing the curvature of field in the sub-scanning direction before and after a rise in temperature in the first embodiment of the present invention.
Figure 7:
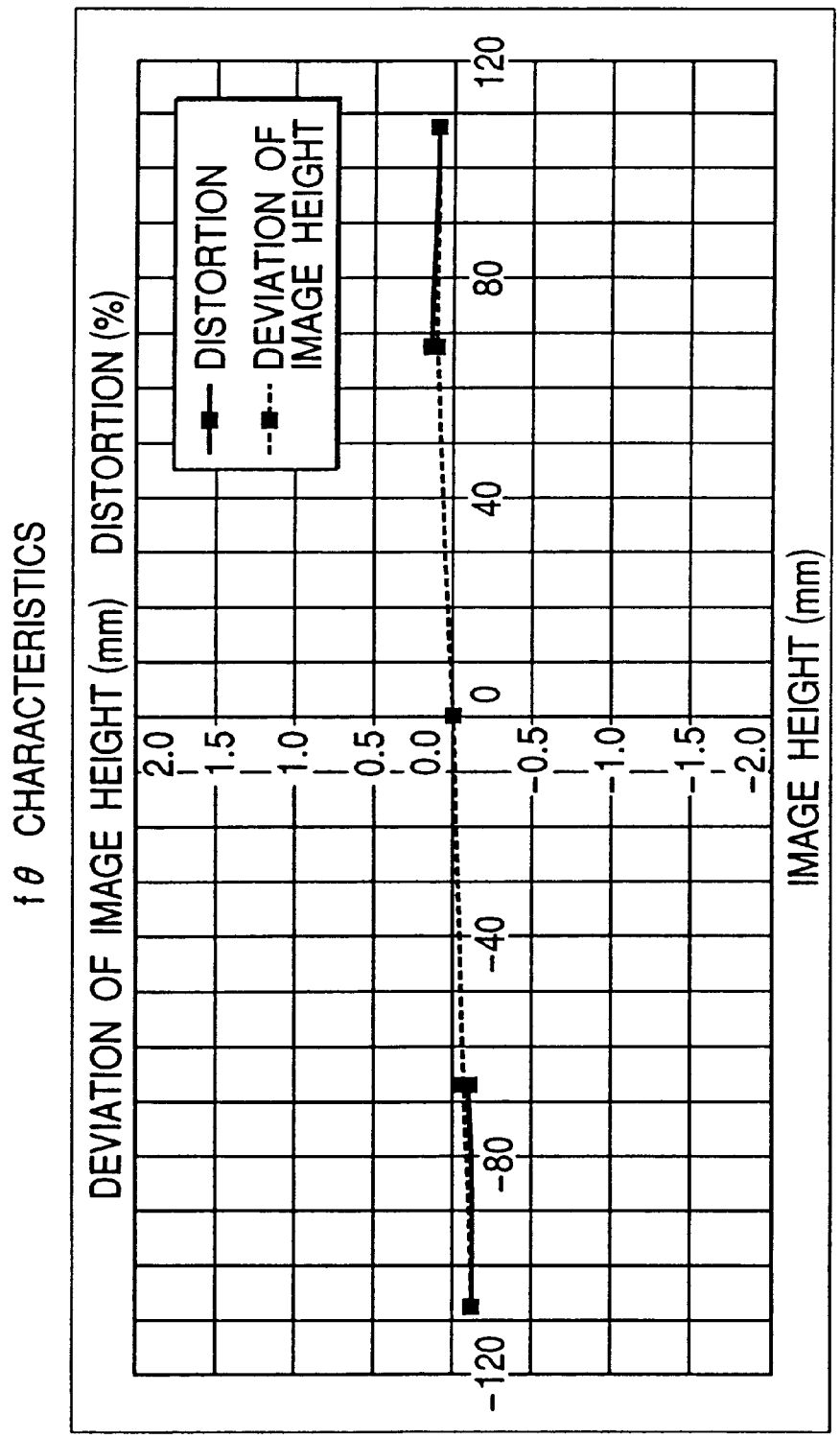
FIG. 7 is a graph showing the distortion (fθ characteristic) and the deviation of image height in the first embodiment of the present invention.

FIG. 5 shows the curvature of field in the main scanning direction before and after a rise in temperature in this embodiment. FIG. 6 shows the curvature of field in the sub-scanning direction before and after the rise in temperature in this embodiment. FIG. 7 shows the distortion (fθ characteristic) and the deviation of image height in this embodiment. Referring to each of FIGS. 5 and 6, the dotted line represents the curvature of field at a room temperature of 25° C.; and the solid line, the curvature of field when the temperatures rises from 25° C. to 50° C. In this case, a refractive index n* of the first and second optical elements 6a and 6b and a wavelength λ* of the light source means 1 are respectively set as:

n*=1.5212

λ*=786.4 nm

As is obvious from FIGS. 5 and 6, the focus shifts are properly corrected both in the main scanning direction and sub-scanning direction.

As described above, in this embodiment, the diffraction grating 8 having powers based on changes in pitch is formed on the second surface 6b2 of the second optical element 6b, of the respective optical surfaces of the optical elements building the scanning optical means 6. With this arrangement, there is provided a compact scanning optical device which can properly correct the optical characteristics by asymmetrically changing the powers of the diffraction optical element 8 within a plane of the second optical element 6b, on which the diffraction optical element 8 is formed, without any symmetrical axis in both the main scanning direction and sub-scanning direction, is resistant to focus changes due to environmental variations (temperature changes), and is capable of high-resolution printing with a simple arrangement.

Figure 8:
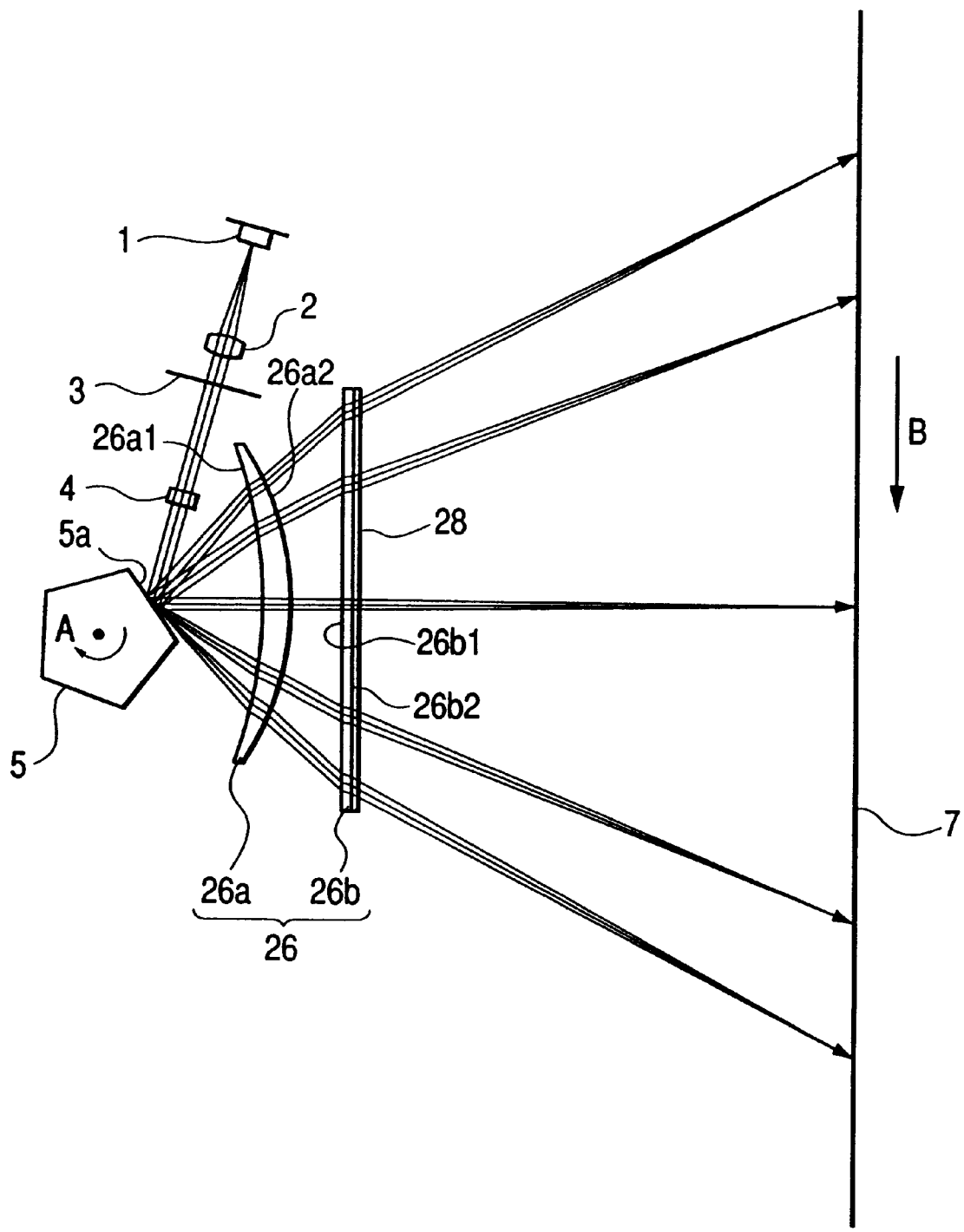
FIG. 8 is a sectional view (main scanning cross-section) of the main part of the second embodiment of the present invention in the main scanning direction.

FIG. 8 is a sectional view (main scanning cross-section) of the main part of the second embodiment of the present invention in the main scanning direction. The same reference numerals in FIG. 8 denote the same parts as in FIG. 2.

This embodiment differs from the first embodiment described above in that a scanning optical means is comprised of a first optical element formed from a refraction system and a second optical element having both a refraction system and a diffraction system, and the first and second optical elements are formed into appropriate shapes accordingly. The arrangement other than this and optical effects of the second embodiment are almost the same as those of the first embodiment, and hence similar effects are obtained.

A scanning optical means 26 has fθ characteristics and a first optical element (fθ lens system) 26a formed from a refraction system, and a second optical element (fθ lens system) 26b having both a refraction system and a diffraction system. The first optical element 26a formed from the refraction system is made of a rotating symmetrical lens having a positive (convex) power. The lens has a first surface (incident surface) 26a1 which is a spherical surface, and a second surface (exit surface) 26a2 which is an aspherical surface. The shapes of the refraction system of the first optical element 26a can be expressed as follows, provided that the intersection between the optical element surface and the optical axis is regarded as an origin, and the optical axis direction, the direction perpendicular to the optical axis within the main scanning cross-section, and the direction perpendicular to the optical axis within the sub-scanning cross-section respectively correspond to the X-axis, the Y-axis, and the Z-axis.

$$X = \frac{h^2/R}{1 + \left(1 - (1+K)(Y/R)^2\right)^{1/2}} + Bh^4 + Ch^6 + Dh^8 + Eh^{10}$$

$$(\text{for } h = (Y^2 + Z^2)^{1/2})$$

where R is the radius of curvature, and K, B, C, D, and E are aspherical coefficients.

The second optical element 26b having both a refraction system and a diffraction system has a first surface (incident surface) 26b1 which is a cylindrical surface in the sub-scanning direction, and a second surface (exit surface) 26b2 which is a flat cylindrical lens having a positive (convex) power in the sub-scanning direction. The radius of curvature of the cylindrical surface asymmetrically changes from an on-axis position to an off-axis position with respect to the optical axis of the second optical element 26b in the main scanning direction. A diffraction grating 28 is formed on the second surface 26b2 such that the powers based on the diffraction system become different positive (convex) powers in the main scanning direction and sub-scanning direction. The powers based on this diffraction asymmetrically change from an on-axis position to an off-axis position with respect to the reference axis without having any symmetrical axis in both the main scanning direction and sub-scanning direction. This second optical element 26b has both a positive power based on the refraction system and a positive power based on the diffraction system in the sub-scanning direction. Both the first and second optical elements 26a and 26b are made of a plastic material. The scanning optical means 26 has a tilt correction function implemented by setting a deflection surface 5a and a scanned surface 7 conjugate with each other within the sub-scanning cross-section.

Table-3 shows an optical configuration in this embodiment. Table-4 shows the aspherical coefficients of the refraction system and the phase coefficients of the diffraction system.

TABLE 3

| Wavelength Used | λ (nm) | 780 |
|---|---|---|
| Refractive Index of First Optical Element | n1 | 1.5242 |
| Refractive Index of Second Optical Element | n2 | 1.5242 |

TABLE 3-continued

| Wavelength Used | λ (nm) | 780 |
| --- | --- | --- |
| Angle Defined by Optical Axes of Optical System Before and After Deflection Means | θ1 (deg) | 75 |
| One-side Maximum Scanning Angle | θ max (deg) | 48 |
| Distance between Deflection Surface and First Optical Element | d1 (mm) | 24.99 |
| Central Thickness of First Optical Element | d2 (mm) | 6.00 |
| Distance between First and Second Optical Elements | d3 (mm) | 12.00 |
| Central thickness of Second Optical Element | d4 (mm) | 2.00 |
| Distance between Second Optical Element and Scanned Surface | d5 (mm) | 122.11 |
| fθ Coefficient | f | 128 |
| Deflection Means (Rotating Polygonal Mirror) | φ30, 5 surfaces | |

TABLE 4

Shape of Refraction System

| First Optical Element | | | Second Optical Element | |
| --- | --- | --- | --- | --- |
| First Surface | Second Surface | | First Surface | Second Surface |
| R −98.7269 | −53.10747 | R | ∞ | ∞ |
| K 0 | −3.41599E+00 | K | 0 | 0 |
| B 0 | 5.82459E−08 | B4 | 0 | 0 |
| c 0 | −9.63075E−10 | B6 | 0 | 0 |
| D 0 | −2.59063E−14 | B8 | 0 | 0 |
| E 0 | 0.00000E+00 | B10 | 0 | 0 |
| | | r | 33.52900 | ∞ |
| | | D2u | 3.10557E−04 | 0 |
| | | D4u | −4.90513E−08 | 0 |
| | | D6u | 0.00000E+00 | 0 |
| | | D8u | 0.00000E+00 | 0 |
| | | D10u | 0.00000E+00 | 0 |
| | | D21 | 1.42091E−04 | 0 |
| | | D41 | 6.17198E−08 | 0 |
| | | D61 | 0.00000E+00 | 0 |
| | | D81 | 0.00000E+00 | 0 |
| | | D101 | 0.00000E+00 | 0 |
| C1 0 | 0 | | 0 | 0.00000E+00 |
| C2 0 | 0 | | 0 | −1.60513E−03 |
| C3 0 | 0 | | 0 | 3.38721E−07 |
| C4 0 | 0 | | 0 | −7.83565E−07 |
| C5 0 | 0 | | 0 | −1.80096E−10 |
| C6 0 | 0 | | 0 | 4.41733E−10 |
| C7 0 | 0 | | 0 | 3.14529E−14 |
| C8 0 | 0 | | 0 | −1.27640E−13 |
| C9 0 | 0 | | 0 | 0.00000E+00 |
| C10 0 | 0 | | 0 | 1.58013E−17 |
| E1 0 | 0 | | 0 | −6.30696E−03 |
| E2 0 | 0 | | 0 | 0.00000E+00 |
| E3 0 | 0 | | 0 | 1.23866E−06 |
| E4 0 | 0 | | 0 | −2.07208E−08 |
| E5 0 | 0 | | 0 | −2.78130E−10 |
| E6 0 | 0 | | 0 | 1.92551E−11 |
| E7 0 | 0 | | 0 | 1.14331E−14 |
| E8 0 | 0 | | 0 | −4.13039E−15 |
| E9 0 | 0 | | 0 | 0.00000E+00 |

Figure 9:
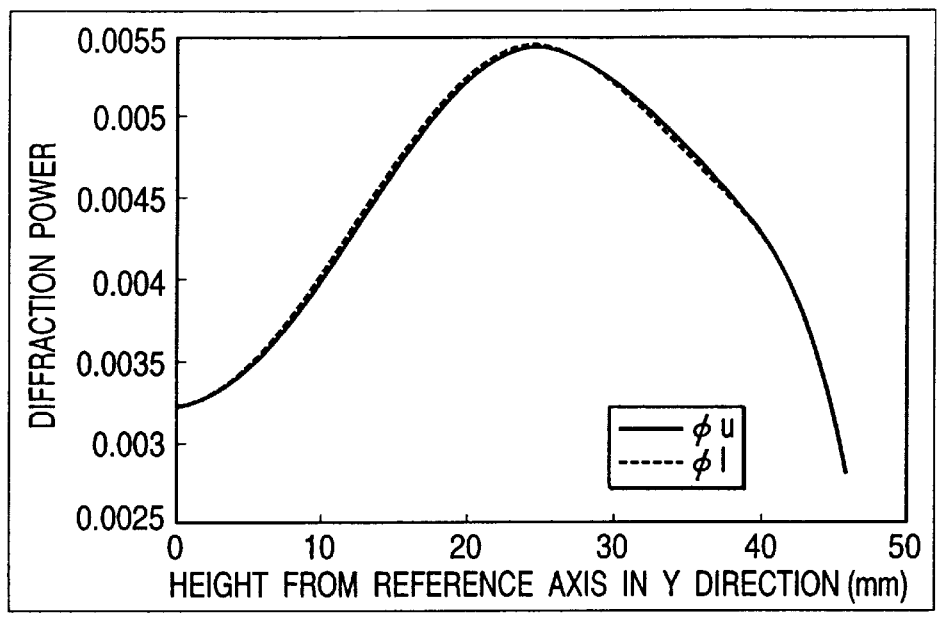
FIG. 9 is a graph showing how the diffraction power in the main scanning direction changes in the second embodiment of the present invention.
Figure 10:
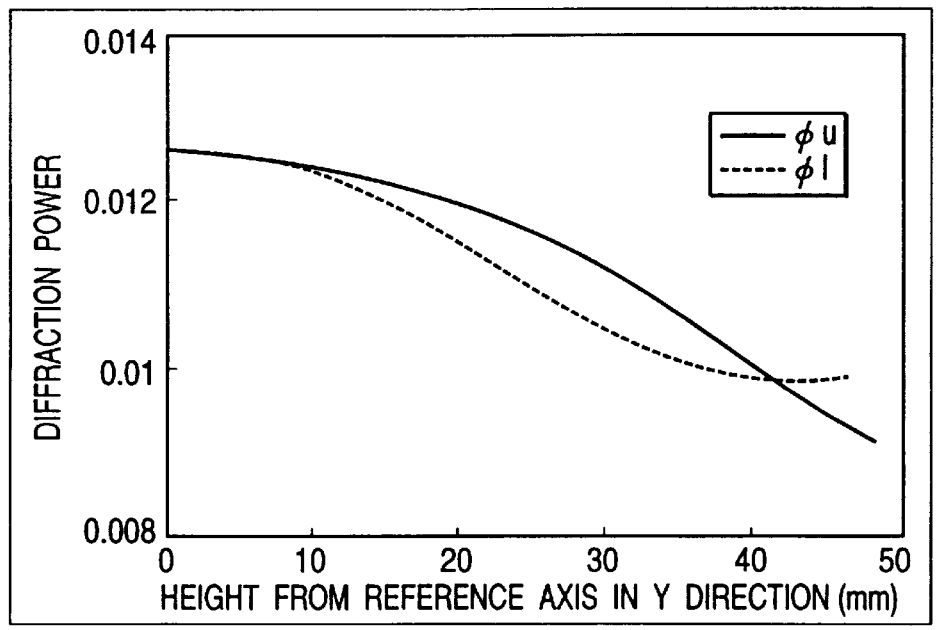
FIG. 10 is a graph showing how the diffraction power in the sub-scanning direction changes in the second embodiment of the present invention.

FIG. 9 shows how the diffraction power of the second optical element 26b in this embodiment changes in the main scanning direction. FIG. 10 shows how the diffraction power changes in the sub-scanning direction. In this embodiment, the powers based on the diffraction asymmetrically change from an on-axis position to an off-axis position with respect to the reference axis in both the main scanning direction and sub-scanning direction. In the sub-scanning direction, a power Po on the on-axis position and a power Py on the off-axis position both with respect to the reference axis satisfy $$Po > Py \quad (1)$$

If these powers do not satisfy inequality (1), the curvature of field is difficult to correct, and the sub-scanning magnification cannot be kept uniform as in the first embodiment. In this embodiment, the optical axis of the first optical element 26a coincides with the reference axis of the second optical element 26b, and shifts from the optical axis of the total system toward the side opposite to the laser by 0.45 mm.

Figure 11:
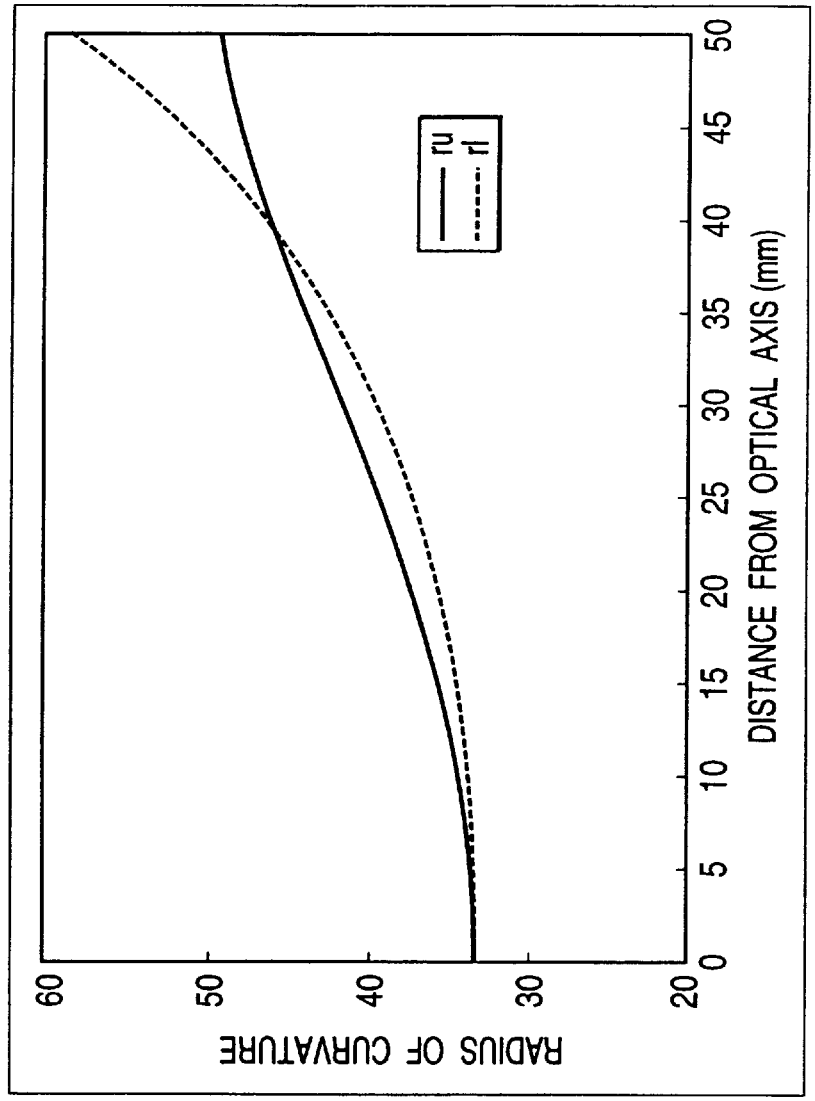
FIG. 11 is a graph showing how the radius of curvature of a cylindrical surface changes in the second embodiment of the present invention.

In addition, as described above, the radius of curvature of the cylindrical surface as the first surface 26b1 of the second optical element 26b asymmetrically changes from an on-axis position to an off-axis position with respect to the optical axis of the second optical element 26b in the main scanning direction. FIG. 11 shows this state. With these arrangements, the optical characteristics can be properly corrected.

In addition, in the scanning optical means 26 in this embodiment, focus shifts in the main scanning direction and sub-scanning direction, which are caused by changes in the refractive index of the lens material due to environmental variations (temperature changes), are corrected by changes in the diffraction power of the second optical element 26b owing to variations in the wavelength of the semiconductor laser 1.

Figure 12:
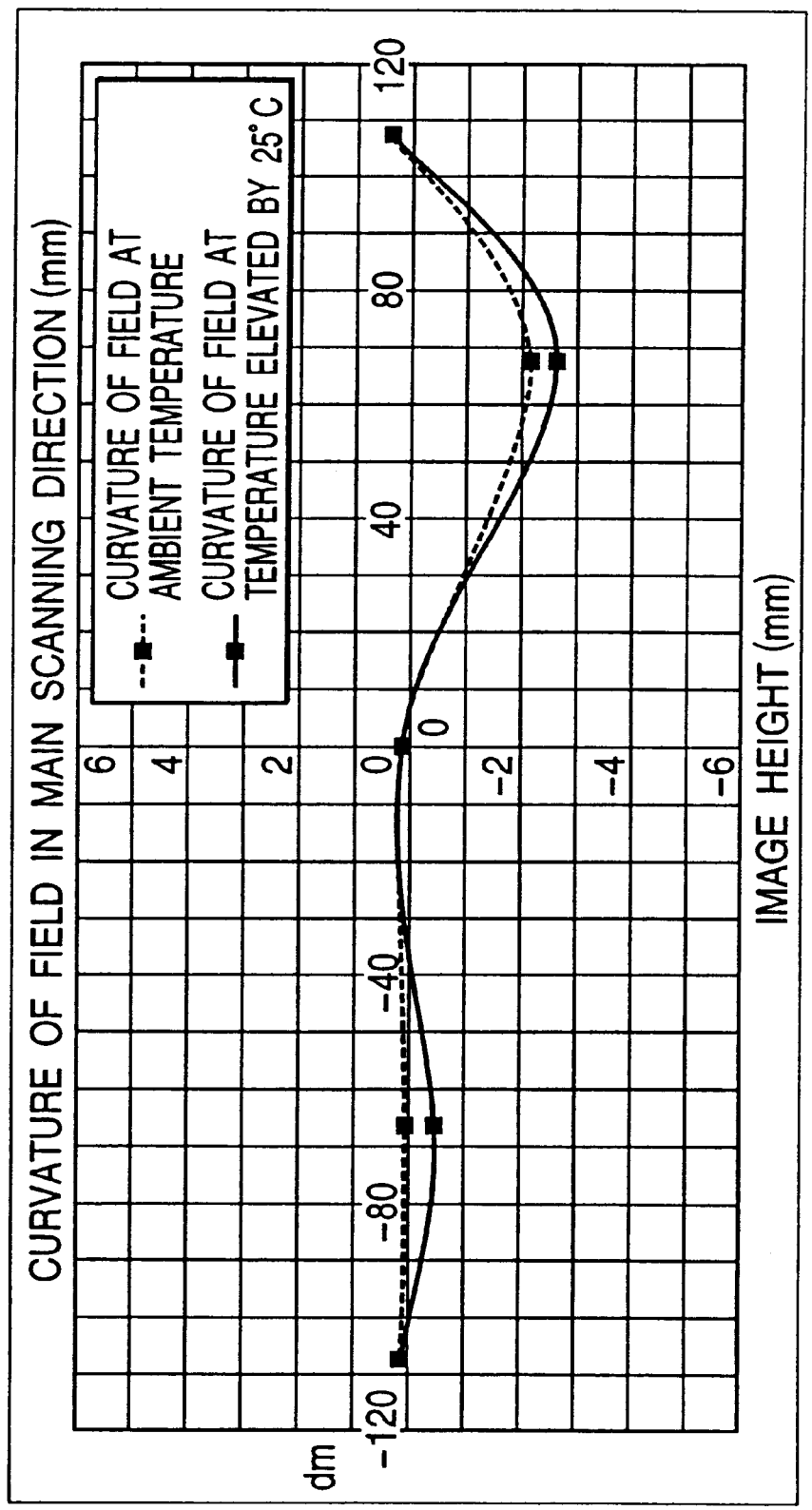
FIG. 12 is a graph showing the curvature of field in the main scanning direction before and after a rise in temperature in the second embodiment of the present invention.
Figure 13:
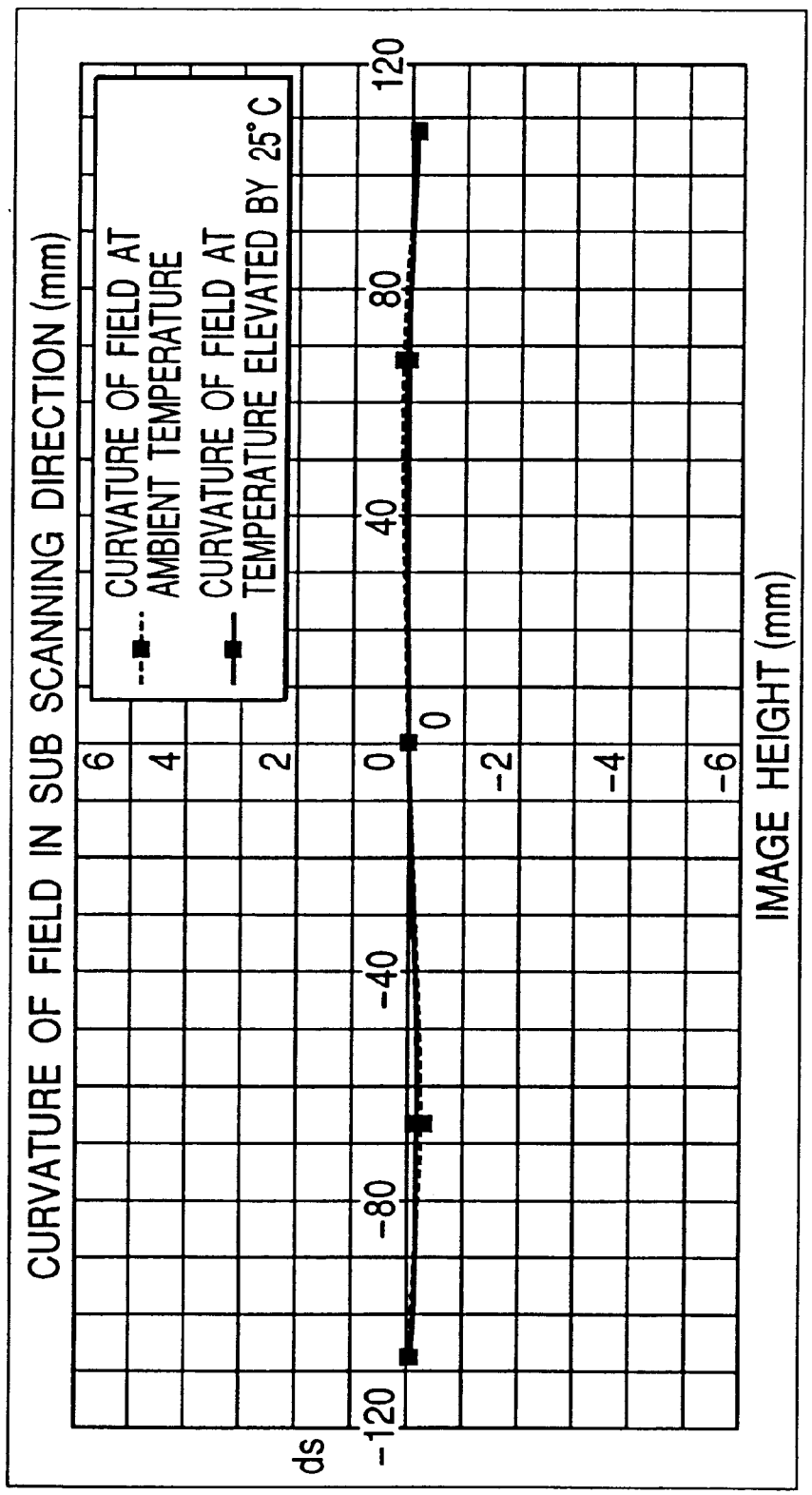
FIG. 13 is a graph showing the curvature of field in the sub-scanning direction before and after a rise in temperature in the second embodiment of the present invention.
Figure 14:
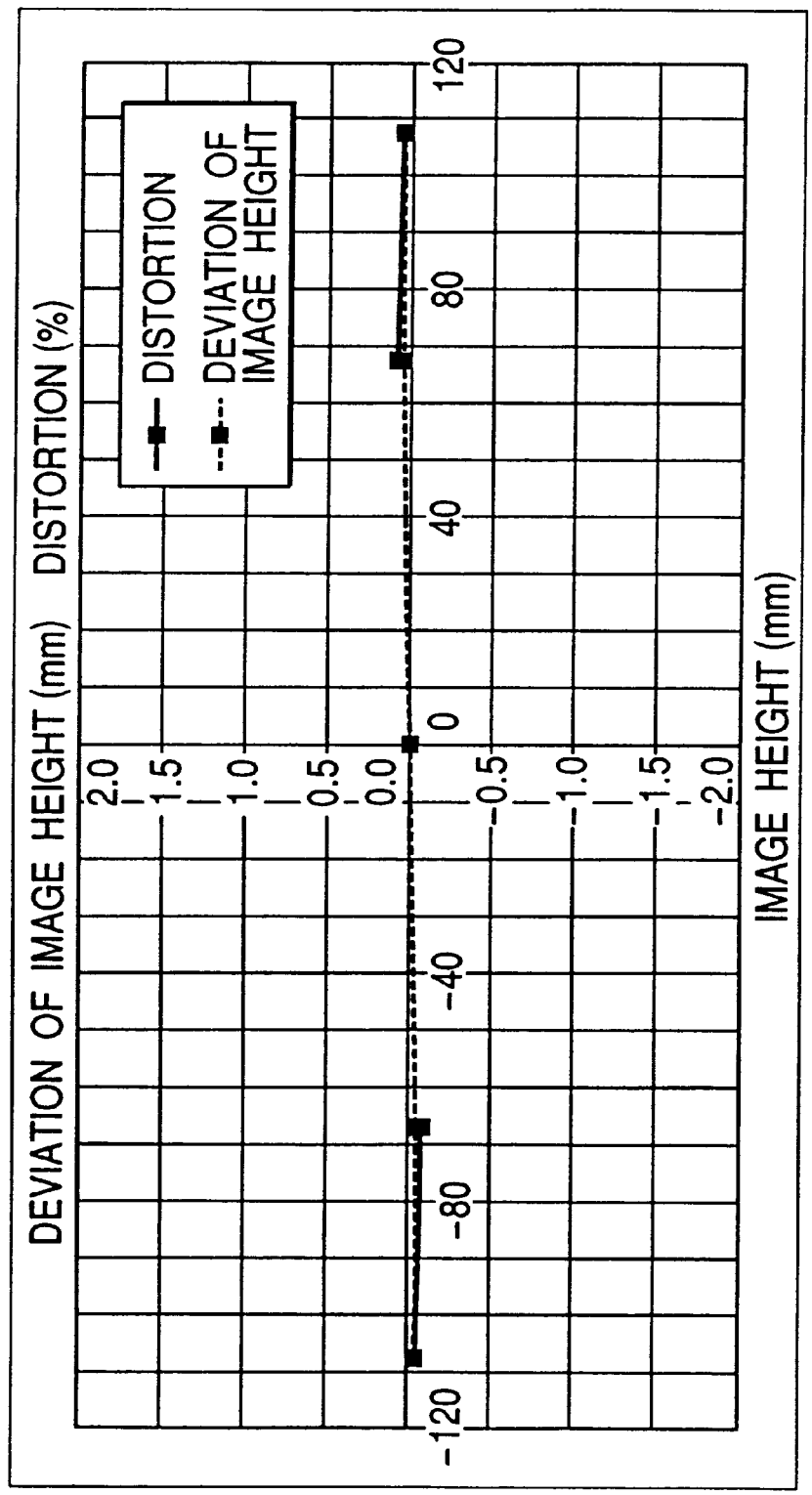
FIG. 14 is a graph showing the distortion (fθ characteristic) and the deviation of image height in the second embodiment of the present invention.

FIG. 12 shows the curvature of field in the main scanning direction before and after a rise in temperature in this embodiment. FIG. 13 shows the curvature of field in the sub-scanning direction before and after the rise in temperature in this embodiment. FIG. 14 shows the distortion (fθ characteristic) and the deviation of image height in this embodiment. Referring to each of FIGS. 12 and 13, the dotted line represents the curvature of field at a room temperature of 25° C.; and the solid line, the curvature of field when the temperatures rises from 25° C. to 50° C. In this case, a refractive index n* of the first and second optical elements 26a and 26b and a wavelength λ* of the light source means 1 are respectively set as:

$$n^* = 1.5212$$

$$\lambda^* = 786.4 \text{ nm}$$

As is obvious from FIGS. 12 and 13, the focus shifts are properly corrected both in the main scanning direction and sub-scanning direction.

As described above, in this embodiment, the diffraction grating 28 having powers based on changes in pitch is formed on the second surface 26b2 of the second optical element 26b, of the respective optical surfaces of the optical elements constructing the scanning optical means 26. With this arrangement, there is provided a compact scanning optical device which can properly correct the optical characteristics by asymmetrically changing the powers of the diffraction optical element 28 within a plane of the second optical element 26b, on which the diffraction optical element 28 is formed, without any symmetrical axis in both the main scanning direction and sub-scanning direction and asymmetrically changing the radius of curvature of the cylindrical surface as the first surface 26b1 of the second optical element 26b from an on-axis position to an off-axis position with respect to the optical axis of the second optical element 26b in the main scanning direction, is resistant to focus changes due to environmental variations (temperature changes), and is capable of high-resolution printing with a simple arrangement.

Figure 15:
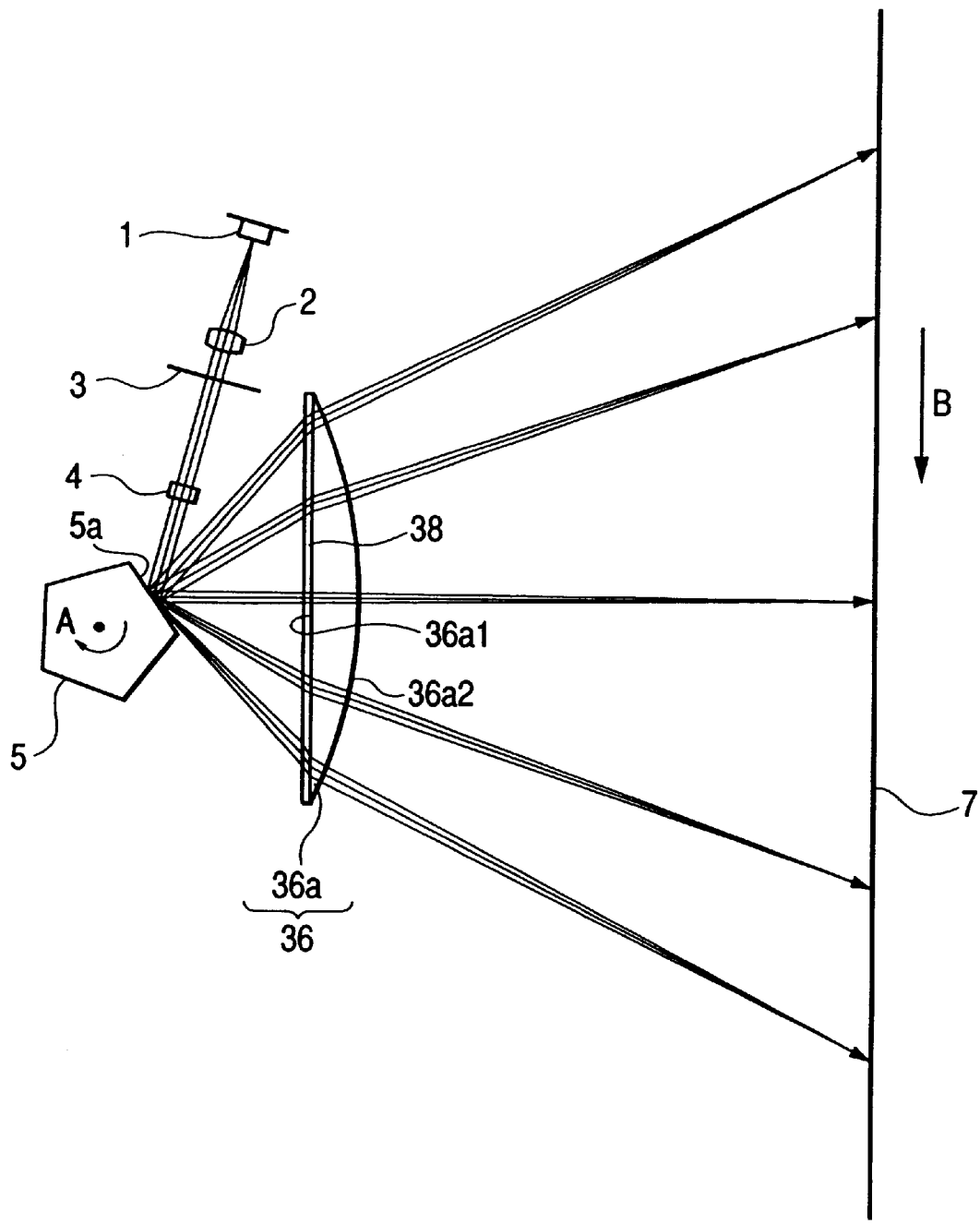
FIG. 15 is a sectional view (main scanning cross-section) of the main part of the third embodiment of the present invention in the main scanning direction.

FIG. 15 is a sectional view (main scanning cross-section) of the main part of the third embodiment of the present invention in the main scanning direction. The same reference numerals in FIG. 15 denote the same parts as in FIG. 2.

This embodiment differs from the first embodiment described above in that a scanning optical means is formed from a single optical element having both a refraction system and diffraction system, and the optical element is appropriately shaped accordingly. The arrangement other than this and optical effects of the third embodiment are almost the same as those of the first embodiment, and hence similar effects are obtained.

Referring to FIG. 15, a scanning optical means 36 has fθ characteristics and a single optical element (fθ lens system) 36a having both a refraction system and a diffraction system. A first surface (incident surface) 36a1 of the first optical element 36a is a cylindrical surface and has a power in the main scanning direction. A diffraction grating 38 is formed on the first surface 36a1 such that the powers based on the diffraction system become different positive (convex) powers in the main scanning direction and sub-scanning direction. The powers based on this diffraction asymmetrically change from an on-axis position to an off-axis position with respect to the reference axis without having any symmetrical axis in both the main scanning direction and sub-scanning direction. A second surface (exit surface) 36a2 is a toric surface and has powers in the main scanning direction and sub-scanning direction, which asymmetrically change from an on-axis position to an off-axis position with respect to the optical axis of the single optical element 36a. This single optical element 36a is made of a plastic material. The scanning optical means 36 has a tilt correction function implemented by setting the deflection surface 5a and a scanned surface 7 conjugate with each other within the sub-scanning cross-section.

Table-5 shows an optical configuration in this embodiment. Table-6 shows the aspherical coefficients of the refraction system and the phase coefficients of the diffraction system.

TABLE 5

| Wavelength Used | λ(nm) | 780 |
| --- | --- | --- |
| Refractive Index of First Optical Element | n1 | 1.5242 |
| Refractive Index of Second Optical Element | n2 | 1.5242 |
| Angle Defined by Optical Axes of Optical System Before and After Deflection Means | θ1 (deg) | 75 |
| One-side Maximum Scanning Angle | θ max (deg) | 48 |
| Distance between Deflection Surface and First Optical Element | d1 (mm) | 36.15 |
| Central Thickness of First Optical Element | d2 (mm) | 10.85 |
| Distance between First and Second Optical Elements | d3 (mm) | 123.41 |
| fθ Coefficient | f | 128 |
| Deflection Means (Rotating Polygonal Mirror) | | φ30, 5 surfaces |

TABLE 6

| | Shape of Refraction System First Optical Element | |
| --- | --- | --- |
| | First Surface | Second Surface |
| R | 7512.98265 | −127.19008 |
| Ku | 0 | 4.63360E+00 |
| B4u | 0 | −2.53196E−08 |
| B6u | 0 | −2.53856E−11 |
| B8u | 0 | 1.26193E−13 |
| B10u | 0 | −1.42922E−17 |
| K1 | 0 | 4.63360E+00 |
| B41 | 0 | 9.66344E−08 |
| B61 | 0 | 1.88993E−11 |
| B81 | 0 | 9.57005E−14 |
| B101 | 0 | −1.19288E−17 |
| r | −27.95510 | |
| D2u | 0 | 2.45544E−04 |
| D4u | 0 | −8.20246E−08 |
| D6u | 0 | −2.15953E−11 |
| D8u | 0 | 2.30087E−14 |
| D10u | 0 | 0.00000E+00 |
| D21 | 0 | 2.45544E−04 |
| D41 | 0 | −2.31016E−08 |
| D61 | 0 | −5.13069E−11 |
| D81 | 0 | 2.28648E−14 |
| D101 | 0 | 0 |
| C1 | 0.00000E+00 | 0 |
| C2 | −1.89887E−03 | 0 |
| C3 | 1.42835E−06 | 0 |
| C4 | 4.35042E−07 | 0 |
| C5 | 5.18062E−10 | 0 |
| C6 | −1.33273E−10 | 0 |
| C7 | −3.70920E−13 | 0 |
| C8 | −1.09236E−14 | 0 |
| C9 | 3.73701E−17 | 0 |
| C10 | 1.02263E−17 | 0 |
| E1 | −7.40796E−03 | 0 |
| E2 | 0.00000E+00 | 0 |
| E3 | 1.52237E−06 | 0 |
| E4 | 3.78908E−09 | 0 |
| E5 | 3.52974E−10 | 0 |
| E6 | −2.64947E−12 | 0 |
| E7 | −2.91400E−13 | 0 |
| E8 | 0.00000E+00 | 0 |
| E9 | 0.00000E+00 | 0 |

Figure 16:
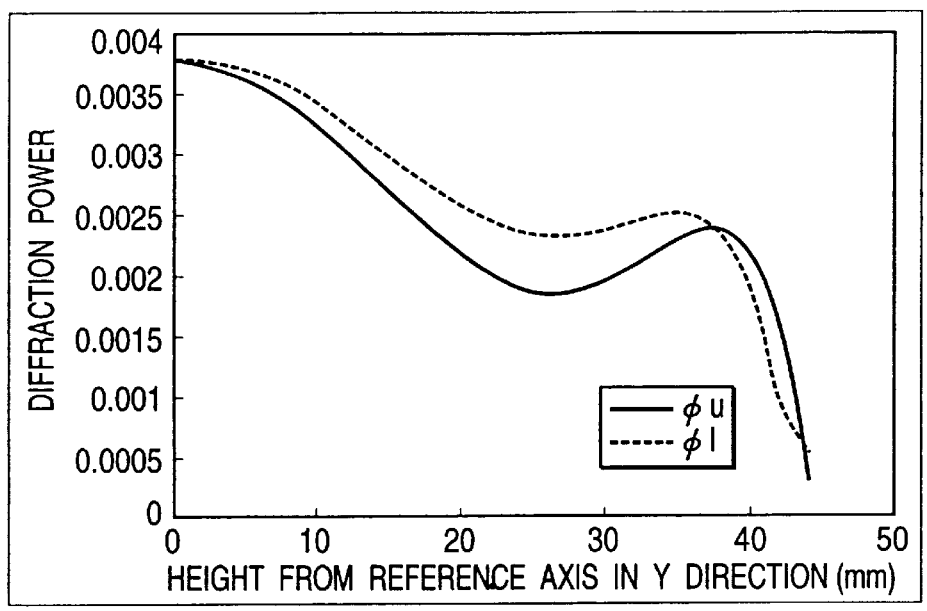
FIG. 16 is a graph showing how the diffraction power in the main scanning direction changes in the third embodiment of the present invention.
Figure 17:
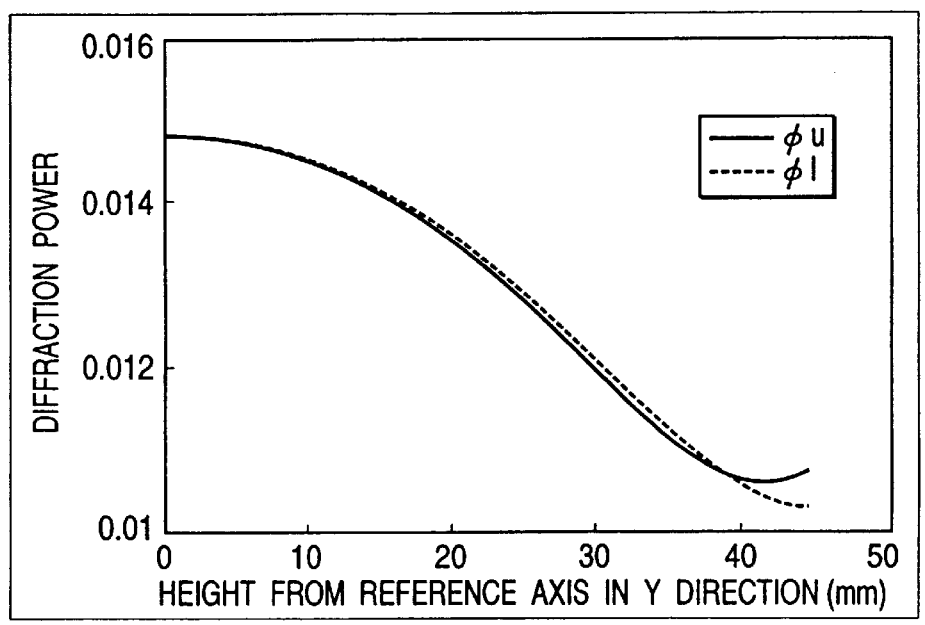
FIG. 17 is a graph showing how the diffraction power in the sub-scanning direction changes in the third embodiment of the present invention.

FIG. 16 shows how the diffraction power of the single optical element 36b in this embodiment changes in the main scanning direction. FIG. 17 shows how the diffraction power changes in the sub-scanning direction. In this embodiment, the powers based on the diffraction asymmetrically change from an on-axis position to an off-axis position with respect to the reference axis in both the main scanning direction and sub-scanning direction. In the sub-scanning direction, a power Po on the on-axis position and a power Py on the off-axis position both with respect to the reference axis satisfy $$Po > Py \tag{1}$$

If these powers do not satisfy inequality (1), the curvature of field is difficult to correct, and the sub-scanning magnification cannot be kept uniform as in the first embodiment. In this embodiment, the reference axis of the single optical element 36a shifts from the optical axis of the total system toward the side opposite to the laser by 0.7 mm.

Figure 18:
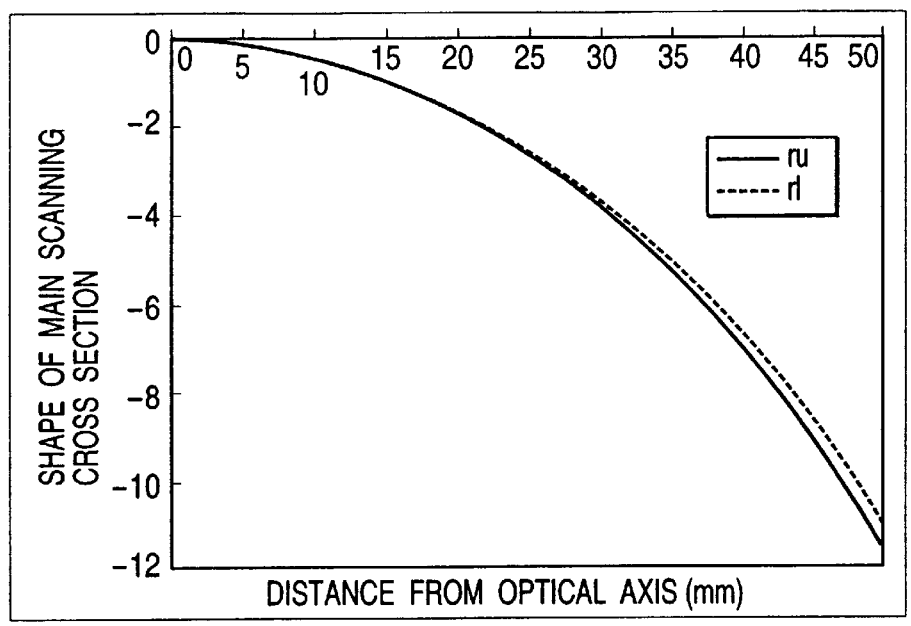
FIG. 18 is a graph showing the configuration of a toric surface in a main scanning section in the third embodiment of the present invention.
Figure 19:
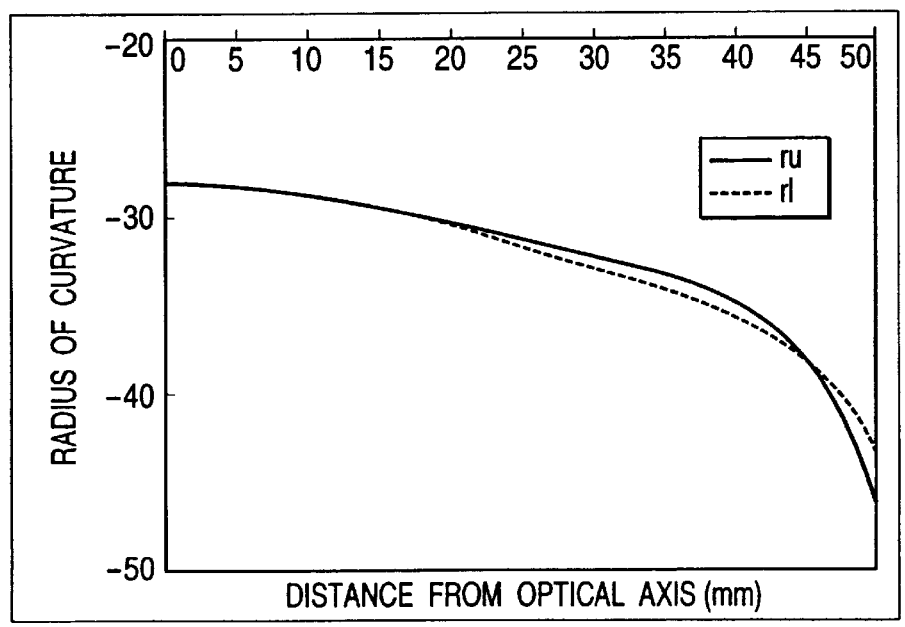
FIG. 19 is a graph showing how the radius of curvature of the toric surface changes in the sub-scanning direction in the third embodiment of the present invention.

The shape of the toric surface as the second surface 36a2 of the single optical element 36a asymmetrically changes from an on-axis position to an off-axis position with respect to the optical axis of the optical element 36a. FIG. 18 shows this state. In addition, the radius of curvature of the toric surface in the sub-scanning direction asymmetrically changes from an on-axis position to an off-axis position with respect to the optical axis of the single optical element 36a. FIG. 19 shows this state. With these arrangements, the optical characteristics can be properly corrected.

In addition, in the scanning optical means 36 in this embodiment, focus shifts in the main scanning direction and sub-scanning direction, which result from changes in the refractive index of the lens material due to environmental variations (temperature changes), are corrected by changes in the diffraction power of the single optical element 36b owing to variations in the wavelength of a semiconductor laser 1.

Figure 20:
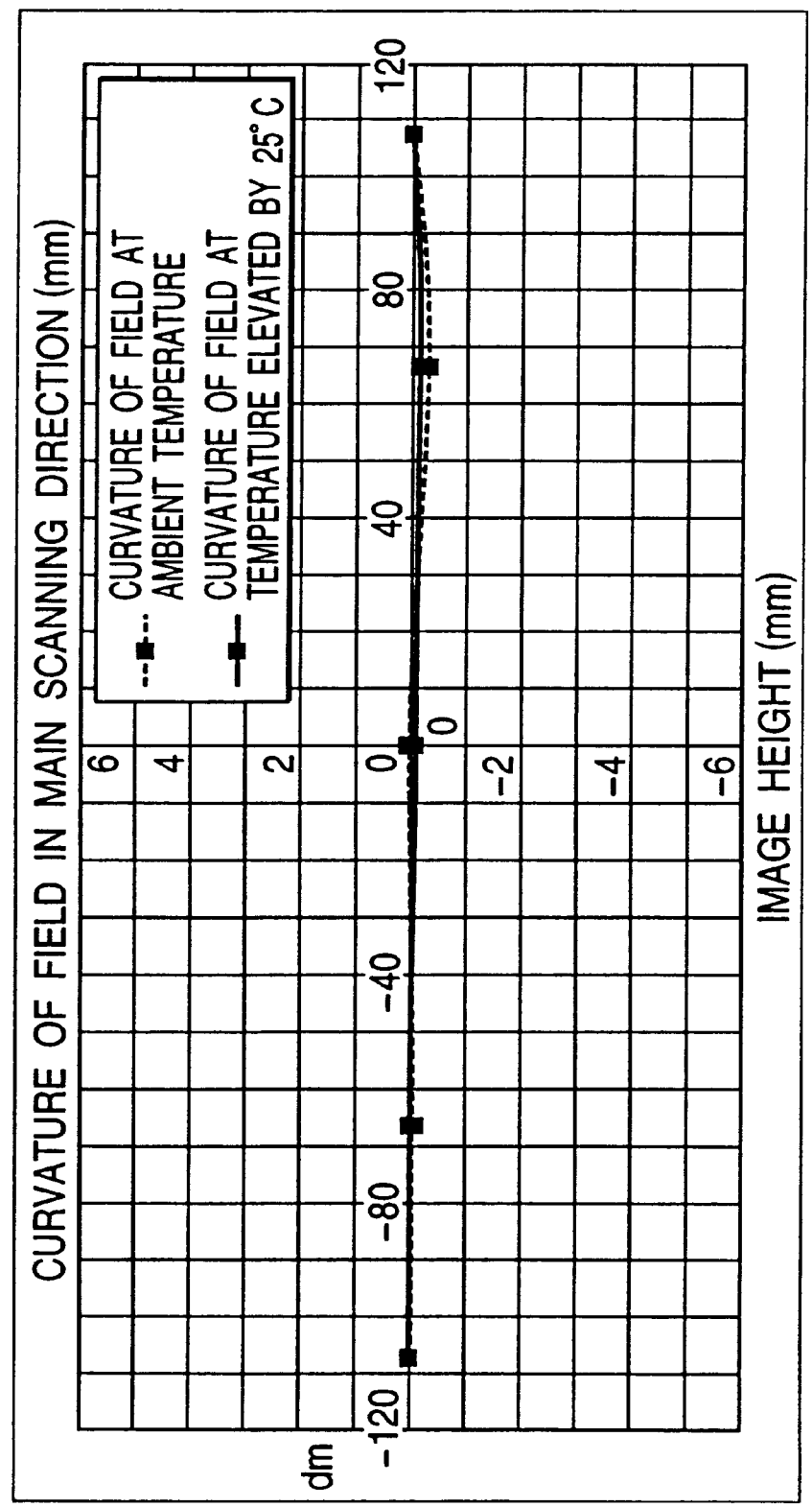
FIG. 20 is a graph showing the curvature of field in the main scanning direction before and after a rise in temperature in the third embodiment of the present invention.
Figure 21:
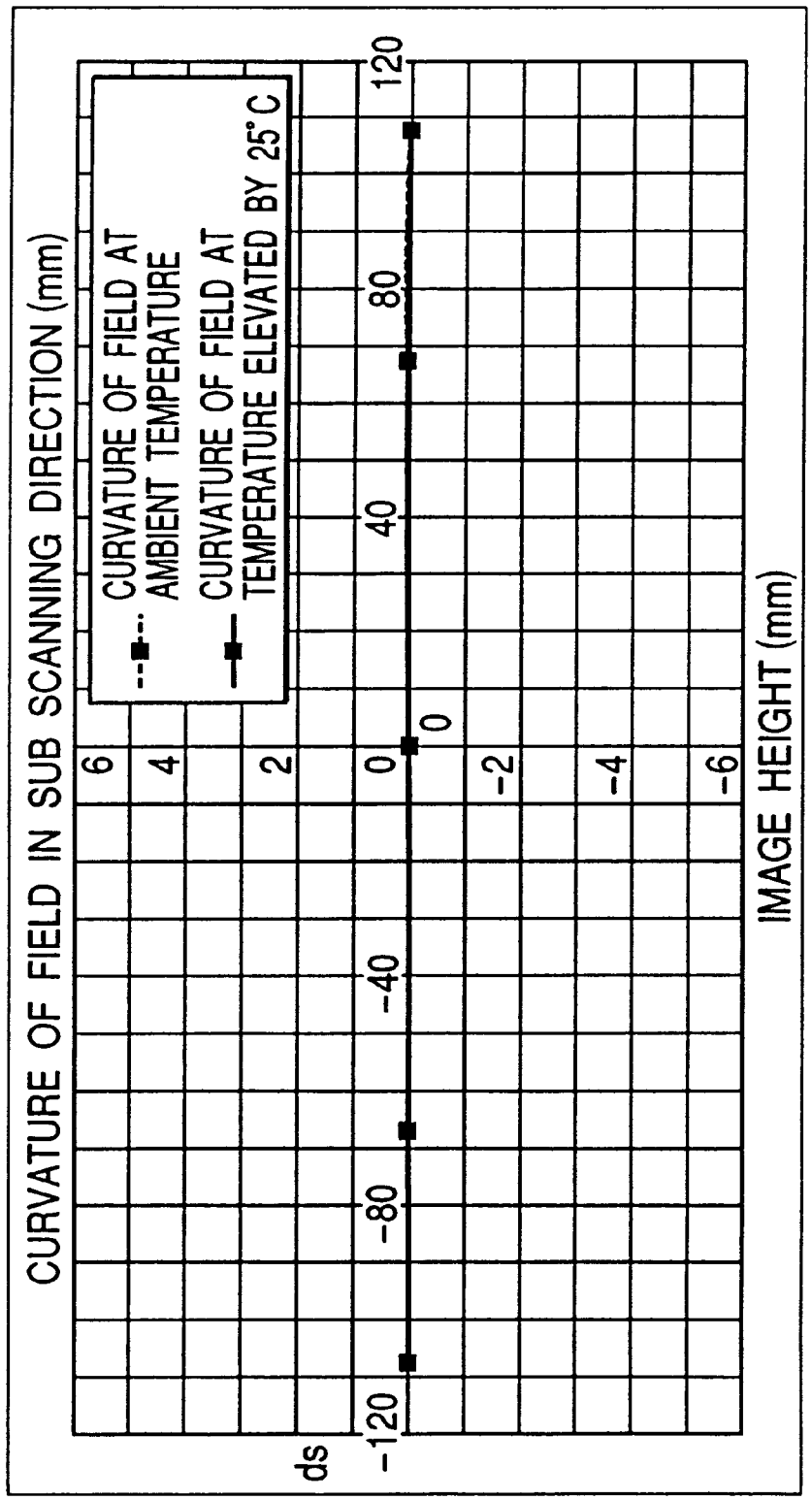
FIG. 21 is a graph showing the curvature of field in the sub-scanning direction before and after a rise in temperature in the third embodiment of the present invention.
Figure 22:
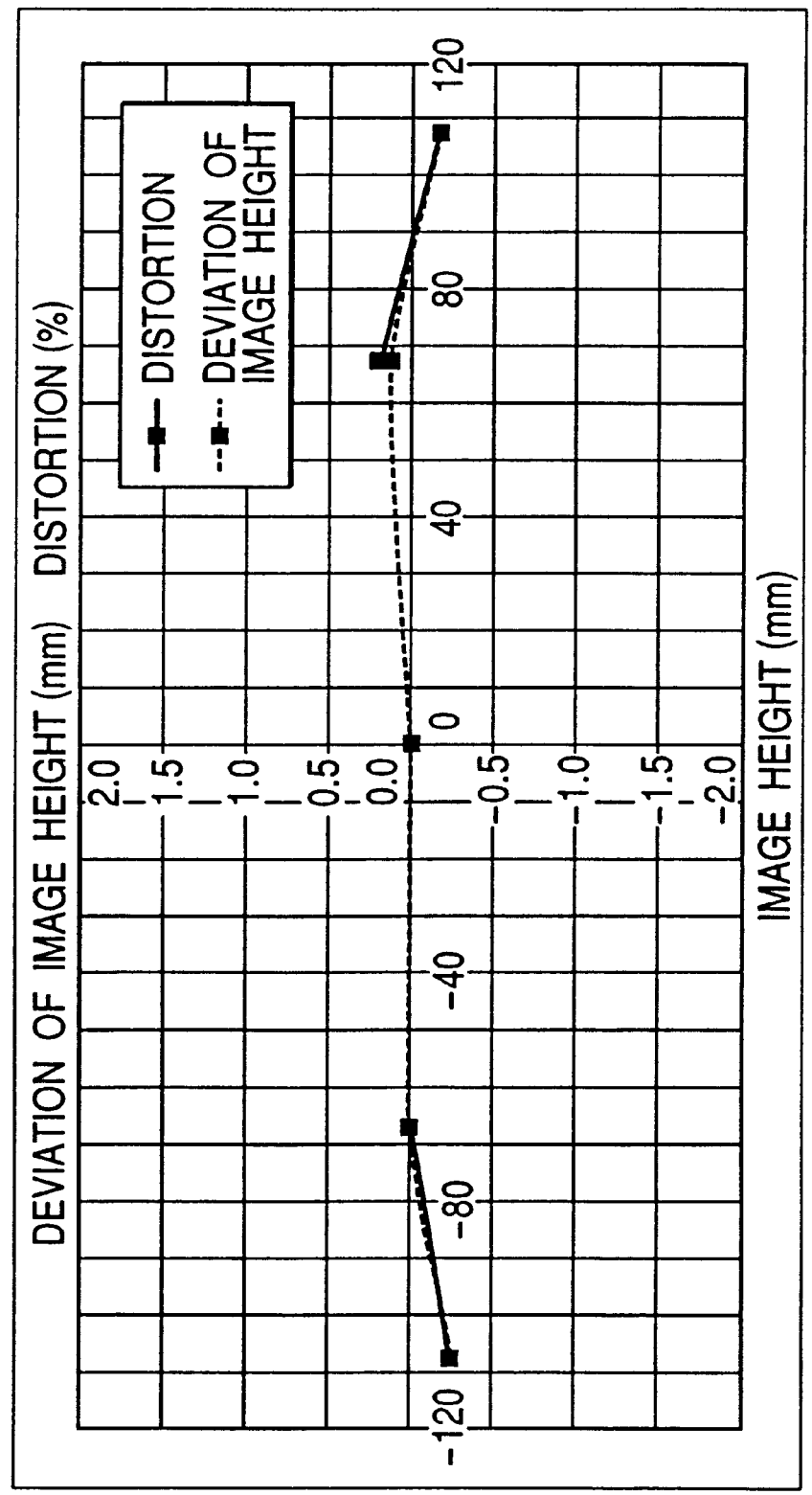
FIG. 22 is a graph showing the distortion (fθ characteristic) and the deviation of image height in the third embodiment of the present invention.

FIG. 20 shows the curvature of field in the main scanning direction before and after a rise in temperature in this embodiment. FIG. 21 shows the curvature of field in the sub-scanning direction before and after the rise in temperature in this embodiment. FIG. 22 shows the distortion (fθ characteristic) and the deviation of image height in this embodiment. Referring to each of FIGS. 20 and 21, the dotted line represents the curvature of field at a room temperature of 25° C.; and the solid line, the curvature of field when the temperatures rises from 25° C. to 50° C. In this case, a refractive index n* of the first and second optical elements 36a and 36b and a wavelength λ* of the light source means 1 are respectively set as:

n*=1.5212

λ*=786.4 nm

As is obvious from FIGS. 12 and 13, the focus shifts both in the main scanning direction and sub-scanning direction are properly corrected.

As described above, in this embodiment, the diffraction grating 38 having powers based on changes in pitch is formed on the first surface 36a1 of the single optical element 36a, of the respective optical surfaces of the optical element forming the scanning optical means 36. With this arrangement, there is provided a compact scanning optical device which can properly correct the optical characteristics by asymmetrically changing the powers of the diffraction optical element 38 within a plane of the optical element surface, on which the diffraction optical element 38 is formed, without any symmetrical axis in both the main scanning direction and sub-scanning direction and asymmetrically changing the shape of the second surface 36a2 from an on-axis position to an off-axis position with respect to the optical axis in both the main scanning direction and sub-scanning direction, is resistant to focus changes due to environmental variations (temperature changes), and is capable of high-resolution printing with a simple arrangement.

Figure 23:
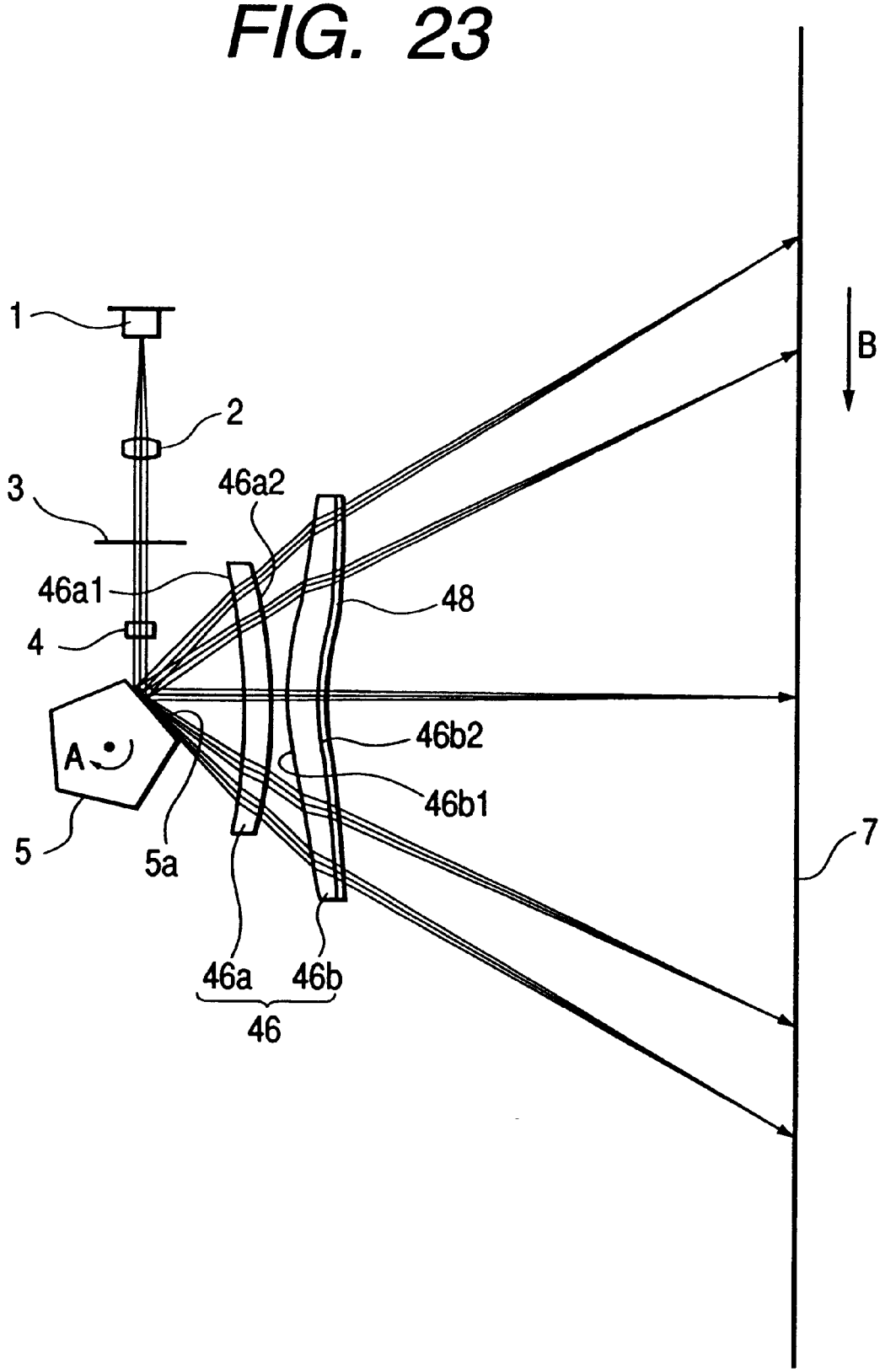
FIG. 23 is a sectional view (main scanning cross-section) of the main part of the fourth embodiment of the present invention in the main scanning direction.

FIG. 23 is a sectional view (main scanning cross-section) of the main part of the fourth embodiment of the present invention in the main scanning direction. The same reference numerals in FIG. 23 denote the same parts as in FIG. 2.

This embodiment differs from the first embodiment described above in that a scanning optical means is comprised of a first optical element formed from a refraction system and a second optical element having both a refraction system and a diffraction system, and the first and second optical elements are formed into appropriate shapes accordingly. The arrangement other than this and optical effects of the fourth embodiment are almost the same as those of the first embodiment, and hence similar effects are obtained.

A scanning optical means 46 has fθ characteristics and a first optical element (fθ lens system) 46a formed from a refraction system, and a second optical element (fθ lens system) 46b having both a refraction system and a diffraction system. The first optical element 46a formed from a refraction system is made of a spherical lens having a positive (convex) power. Both a first surface (incident surface) 46a1 and a second surface (exit surface) 46a2 of the lens are spherical surfaces.

Both a first surface (incident surface) 46b1 and second surface (exit surface) 46b2 of the second optical element 46b having both a refraction and diffraction systems are toric surfaces. A diffraction grating 48 is formed on the second surface 46b2 such that the powers based on the diffraction system become different positive (convex) powers in the main scanning direction and sub-scanning direction. The powers based on this diffraction asymmetrically change from an on-axis position to an off-axis position with respect to the reference axis without having any symmetrical axis in both the main scanning direction and sub-scanning direction. The second optical element 46b has powers based on the refraction and diffraction systems in both the main scanning direction and sub-scanning. Both the first and second optical elements 46a and 46b are made of a plastic material. The scanning optical means 46 has a tilt correction function implemented by setting a deflection surface 5a and a scanned surface 7 conjugate with each other within the sub-scanning cross-section.

Table-7 shows an optical configuration in the this embodiment. Table-8 shows the aspherical coefficients of the refraction system and the phase coefficients of the diffraction system.

TABLE 7

| Wavelength Used | λ(nm) | 780 |
|---|---|---|
| Refractive Index of First Optical Element | n1 | 1.5242 |
| Refractive Index of Second Optical Element | n2 | 1.5242 |
| Angle Defined by Optical Axes of Optical System Before and After Deflection Means | θ1 (deg) | 90 |
| One-side Maximum Scanning Angle | θ max (deg) | 45 |
| Distance between Deflection Surface and First Optical Element | d1 (mm) | 25.34 |
| Central Thickness of First Optical Element | d2 (mm) | 5.60 |
| Distance between First and Second Optical Elements | d3 (mm) | 5.06 |
| Central thickness of Second Optical Element | d4 (mm) | 8.00 |
| Distance between Second Optical Element and Scanned Surface | d5 (mm) | 113.50 |
| fθ Coefficient | f | 136 |
| Deflection Means (Rotating Polygonal Mirror) | | φ20, 4 surfaces |

TABLE 8

| | Shape of Refraction System | | | |
|---|---|---|---|---|
| | First Optical Element | | Second Optical Element | |
| | First Surface | Second Surface | First Surface | Second Surface |
| R | −136.72 | −128.28 | 50.36 | 60.45 |
| Ku | 0 | 0 | −1.44E+01 | −2.07E+01 |
| B4u | 0 | 0 | −1.63E−08 | −1.95E−06 |
| B6u | 0 | 0 | 5.32E−10 | 5.98E−10 |
| B8u | 0 | 0 | −7.61E−14 | −1.71E−13 |
| B10u | 0 | 0 | 1.76E−17 | 4.36E−17 |
| K1 | 0 | 0 | −1.44E+01 | −2.07E+01 |
| B41 | 0 | 0 | −1.63E−06 | −1.95E−06 |
| B61 | 0 | 0 | 5.32E−10 | 5.98E−10 |
| B81 | 0 | 0 | −7.61E−14 | −1.71E−13 |
| B101 | 0 | 0 | 1.78E−17 | 4.36E−17 |
| r | −136.72 | −128.28 | −15.38 | −12.47 |
| D2u | 0 | 0 | 4.84E−03 | 2.25E−03 |
| D4u | 0 | 0 | 4.47E−06 | −9.24E−07 |
| D6u | 0 | 0 | 1.71E−09 | −4.66E−10 |
| D8u | 0 | 0 | −1.06E−11 | 8.99E−13 |
| D10u | 0 | 0 | 1.18E−14 | −3.00E−16 |
| D21 | 0 | 0 | 4.84E−03 | 2.25E−03 |
| D41 | 0 | 0 | 4.47E−06 | −9.24E−07 |
| D61 | 0 | 0 | 1.71E−09 | −4.66E−10 |
| D81 | 0 | 0 | −1.06E−11 | 8.99E−13 |
| D101 | 0 | 0 | 1.18E−14 | −3.00E−16 |
| C1 | | | 0 | 0.00E+00 |

TABLE 8-continued

| | Shape of Refraction System | | | |
| | First Optical Element | | Second Optical Element | |
| | First Surface | Second Surface | First Surface | Second Surface |
|---|---|---|---|---|
| C2 | 0 | 0 | 0 | −1.06E−03 |
| C3 | 0 | 0 | 0 | −4.91E−07 |
| C4 | 0 | 0 | 0 | 1.08E−08 |
| C5 | 0 | 0 | 0 | 7.09E−11 |
| C6 | 0 | 0 | 0 | 1.06E−11 |
| C7 | 0 | 0 | 0 | 0.00E+00 |
| C8 | 0 | 0 | 0 | −6.26E−15 |
| C9 | 0 | 0 | 0 | 0.00E+00 |
| C10 | 0 | 0 | 0 | 0.00E+00 |
| E1 | 0 | 0 | 0 | −6.82E−03 |
| E2 | 0 | 0 | 0 | 0.00E+00 |
| E3 | 0 | 0 | 0 | 5.71E−07 |
| E4 | 0 | 0 | 0 | −1.05E−08 |
| E5 | 0 | 0 | 0 | 1.77E−10 |
| E6 | 0 | 0 | 0 | 9.34E−12 |
| E7 | 0 | 0 | 0 | −7.44E−14 |
| E8 | 0 | 0 | 0 | −2.08E−15 |
| E9 | 0 | 0 | 0 | 1.21E−17 |

Figure 24:
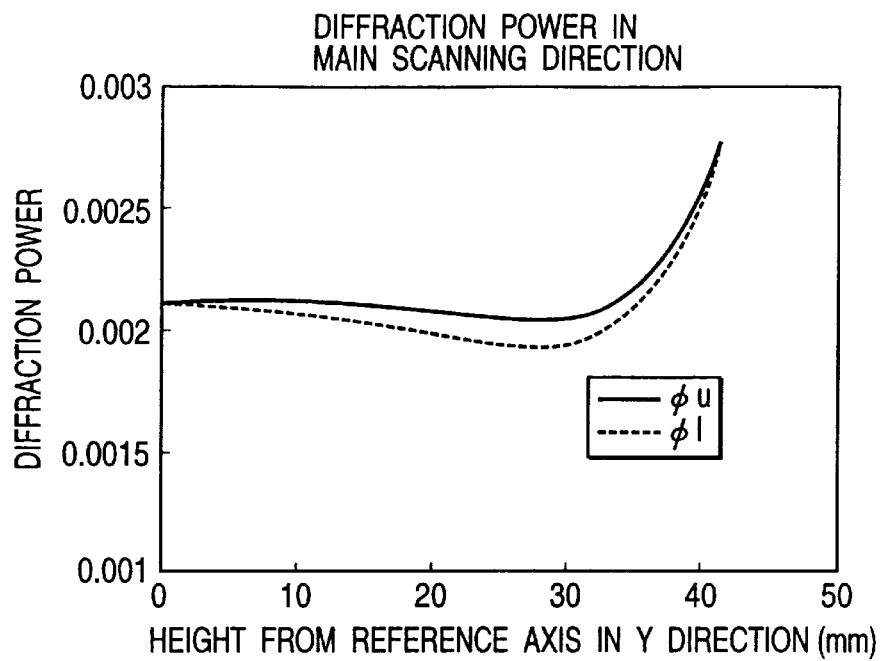
FIG. 24 is a graph showing how the diffraction power in the main scanning direction changes in the fourth embodiment of the present invention.
Figure 25:
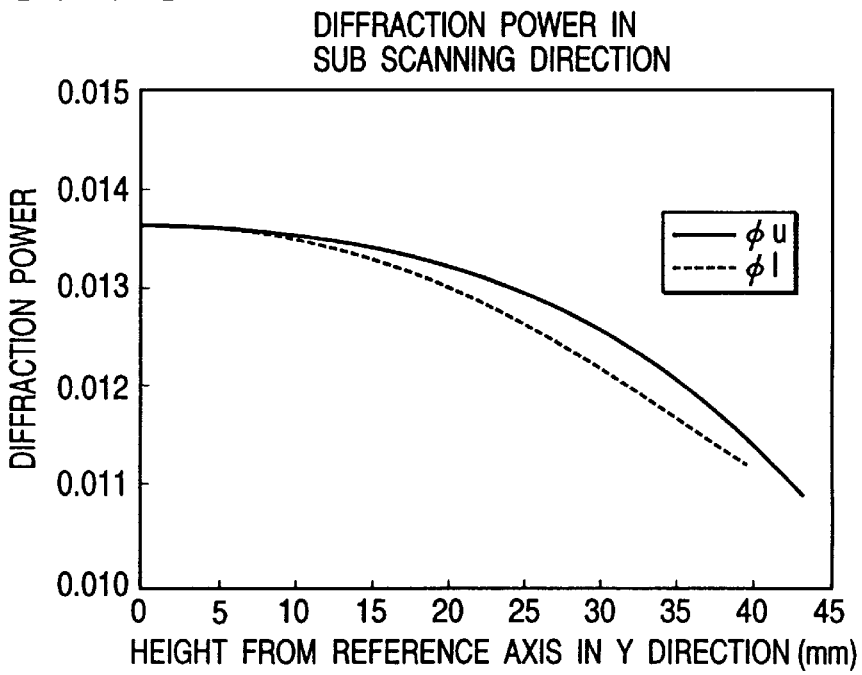
FIG. 25 is a graph showing how the diffraction power in the sub-scanning direction changes in the fourth embodiment of the present invention.

FIG. 24 shows how the diffraction power of the second optical element 46b in this embodiment changes in the main scanning direction. FIG. 25 shows how the diffraction power changes in the sub-scanning direction. In this embodiment, the powers based on the diffraction asymmetrically change from an on-axis position to an off-axis position with respect to the reference axis in both the main scanning direction and sub-scanning direction. In the sub-scanning direction, a power Po on the on-axis position and a power Py on the off-axis position both with respect to the reference axis satisfy $$Po > Py \qquad (1)$$

If these powers do not satisfy inequality (1), the curvature of field is difficult to correct, and the sub-scanning magnification cannot be kept uniform as in the first embodiment.

In addition, in this embodiment, by forming both the surfaces 46b1 and 46b2 of the second optical element 46b into aspherical surfaces in the main scanning direction, the degree of freedom in design is increased, and hence the optical characteristics can be properly corrected, thus obtaining a high-resolution scanning optical device for which a smaller spot diameter is required.

In addition, in the scanning optical means 46 in this embodiment, focus shifts in the main scanning direction and sub-scanning direction, which are caused by changes in the refractive index of the lens material due to environmental variations, are corrected by changes in the diffraction power of the second optical element 46b owing to variations in the wavelength of the semiconductor laser 1.

Figure 26:
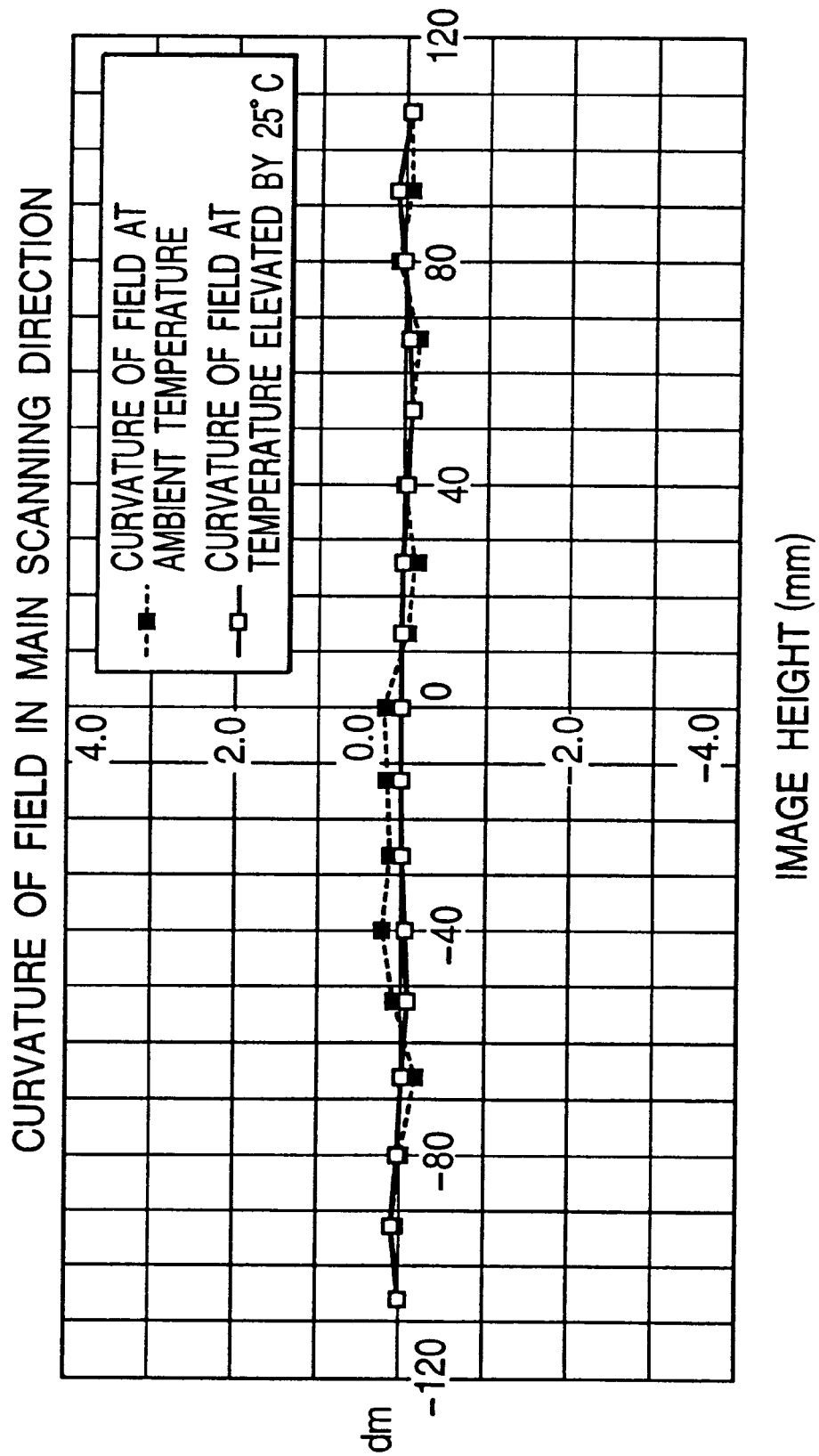
FIG. 26 is a graph showing the curvature of field in the main scanning direction before and after a rise in temperature in the fourth embodiment of the present invention.
Figure 27:
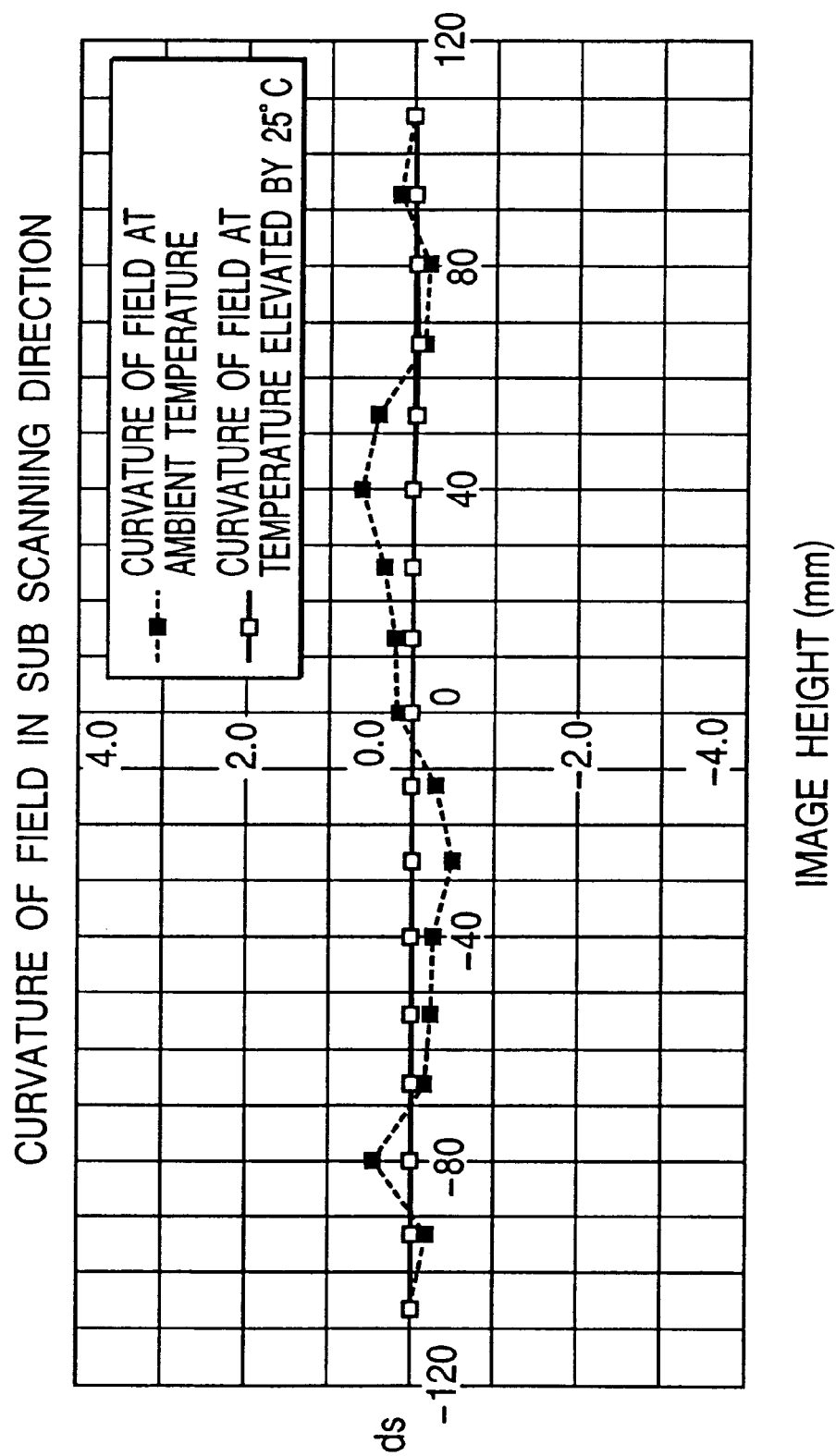
FIG. 27 is a graph showing the curvature of field in the sub-scanning direction before and after a rise in temperature in the fourth embodiment of the present invention.
Figure 28:
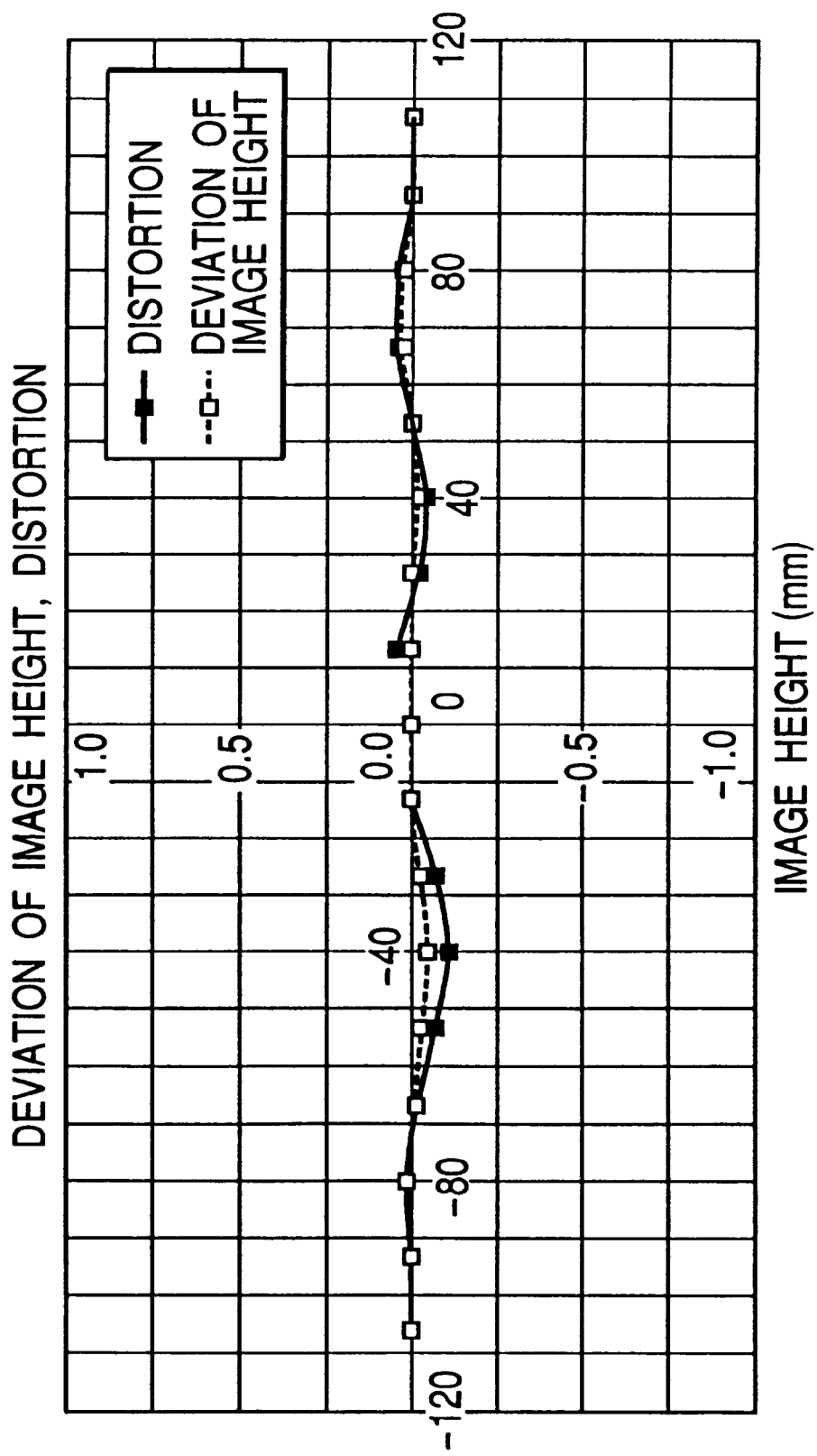
FIG. 28 is a graph showing the distortion (fθ characteristic) and the deviation of image height in the fourth embodiment of the present invention.

FIG. 26 shows the curvature of field in the main scanning direction before and after a rise in temperature in this embodiment. FIG. 27 shows the curvature of field in the sub-scanning direction before and after the rise in temperature in this embodiment. FIG. 28 shows the distortion (fθ characteristic) and the deviation of image height in this embodiment. Referring to each of FIGS. 26 and 27, the dotted line represents the curvature of field at a room temperature of 25° C.; and the solid line, the curvature of field when the temperatures rises from 25° C. to 50° C. In this case, a refractive index n* of the first and second optical elements 46a and 46b and a wavelength λ* of the light source means 1 are respectively set as:

n*=1.5212

λ*=786.4 nm

As is obvious from FIGS. 26 and 27, the focus shifts both in the main scanning direction and sub-scanning direction are properly corrected.

As described above, in this embodiment, the diffraction grating 48 having powers based on changes in pitch is formed on the second surface 46b2 of the second optical element 46b, of the respective optical surfaces of the optical elements constituting the scanning optical means 46. With this arrangement, there is provided a compact scanning optical device which can properly correct the optical characteristics by asymmetrically changing the powers of the diffraction optical element 48 within a plane of the second optical element 46b, on which the diffraction optical element 48 is formed, without any symmetrical axis in both the main scanning direction and sub-scanning direction, is resistant to focus changes due to environmental variations (temperature changes), and is capable of high-resolution printing with a simple arrangement.

In each embodiment described above, the light beam emitted from the light source means 1 is converted into a substantially collimated light beam by the conversion optical element 2. However, this light beam may be converted into a convergent light beam to decrease the distance between the deflection surface 5a of the deflector 5 and the scanned surface 8.

In each embodiment described above, the optical axis is set as the reference axis. However, since a diffraction grating can be arbitrarily formed on an optical element surface, the reference axis may be set at an arbitrary position other than the optical axis.

According to the present invention, as described above, there is provided a compact scanning optical device which can properly correct the optical characteristics (curvature of field and the like) by forming a diffraction grating on at least one surface of the optical surfaces of optical elements constituting a scanning optical means and asymmetrically changing the power of the diffraction grating within a plane of the optical element, on which the diffraction grating is formed, without any symmetrical axis in at least the main scanning direction or the sub-scanning direction, is resistant to focus changes due to environmental variations (temperature changes), and capable of high-resolution printing with a simple arrangement.

In addition, according to the present invention, as described above, there is provided a compact scanning optical device which can properly correct the optical characteristics (curvature of field and the like) by forming a diffraction grating on at least one surface of the optical surfaces of optical elements constituting a scanning optical means, asymmetrically changing the pitch of the diffraction grating within a plane flush with the optical element, on which the diffraction grating is formed, without any symmetrical axis in at least the main scanning direction or the sub-scanning direction, and also asymmetrically changing the shape of at least one surface of the optical surfaces of the optical elements constituting the scanning optical means from an on-axis position to an off-axis position in at least the main scanning direction or the sub-scanning direction, is resistant to focus changes due to environmental variations (temperature changes), and is capable of high-resolution printing with a simple arrangement.

What is claimed is:

1. A scanning optical device comprising:
   light source means;

deflection means for deflecting a light beam emitted from said light source means; and scanning optical means for forming a spot of the light beam deflected by said deflection means on a scanned surface, wherein a diffraction grating having a power based on a change in pitch is formed on at least one of optical surfaces of optical elements constituting said scanning optical means, and the power of said diffraction grating asymmetrically changes within a plane of the optical element surface, on which said diffraction grating is formed, without any symmetrical axis, in at least one of a main scanning direction and sub-scanning direction.

2. A device according to claim 1, wherein the power of said diffraction grating in the main scanning direction asymmetrically changes from an on-axis position to an off-axis position with respect to a reference axis.

3. A device according to claim 1, wherein the power of said diffraction grating in the sub-scanning direction asymmetrically changes from an on-axis position to an off-axis position with respect to a reference axis in the main scanning direction, and a power Po on the on-axis position and a power Py on the off-axis position both with respect to the reference axis satisfy Po>Py.

4. A device according to claim 1, wherein both the powers of said diffraction grating in the main scanning direction and sub-scanning direction asymmetrically change from an on-axis position to an off-axis position with respect to a reference axis, and the power in the sub-scanning direction satisfies Po>Py where Po is a power on the on-axis position and Py is a power on the off-axis position both with respect to the reference axis.

5. A device according to claim 1, wherein said scanning optical means corrects a focus shift in at least one of the main scanning direction and sub-scanning direction, which is caused by a change in refractive index of a lens material due to an environmental variation in said device, by using a diffraction power change caused by a wavelength variation in said light source means.

6. A device according to claim 1, wherein said optical element on which said diffraction grating is formed is made of a plastic material.

7. A device according to claim 2, 3 or 4, wherein the reference axis is an optical axis.

8. A device according to claim 1, wherein said scanning optical device is used for an image forming apparatus for forming an image by using a deflected/scanned light beam.

9. A scanning optical device comprising:

light source means;

deflection means for deflecting a light beam emitted from said light source means; and scanning optical means for forming a spot of the light beam deflected by said deflection means on a scanned surface, wherein a diffraction grating is formed on at least one of optical surfaces of optical elements constituting said scanning optical means, a pitch of said diffraction grating changes without any symmetrical axis in at least one of a main scanning direction and sub-scanning direction, and at least one of the optical surfaces of said optical elements constituting said scanning optical means is asymmetrically shaped from an on-axis position to an off-axis position in at least one of the main scanning direction and sub-scanning direction.

10. A device according to claim 9, wherein the power of said diffraction grating in the main scanning direction asymmetrically changes from an on-axis position to an off-axis position with respect to a reference axis.

11. A device according to claim 9, wherein the power of said diffraction grating in the sub-scanning direction asymmetrically changes from an on-axis position to an off-axis position with respect to a reference axis in the main scanning direction, and a power Po on the on-axis position and a power Py on the off-axis position both with respect to the reference axis satisfy Po>Py.

12. A device according to claim 9, wherein both the powers of said diffraction grating in the main scanning direction and sub-scanning direction asymmetrically change from an on-axis position to an off-axis position with respect to a reference axis, and the power in the sub-scanning direction satisfies Po>Py where Po is a power on the on-axis position and Py is a power on the off-axis position both with respect to the reference axis.

13. A device according to claim 9, wherein a power of said optical element having the asymmetrically shaped optical surface in the main scanning direction asymmetrically changes from an on-axis position to an off-axis position.

14. A device according to claim 9, wherein a power of said optical element having the asymmetrically shaped optical surface in the sub-scanning direction asymmetrically changes from an on-axis position to an off-axis position in the main scanning direction.

15. A device according to claim 9, wherein both powers of said optical element having the asymmetrically shaped optical surface in the main scanning direction and sub-scanning direction asymmetrically change from an on-axis position to an off-axis position.

16. A device according to claim 9, wherein said scanning optical means corrects a focus shift in at least one of the main scanning direction and sub-scanning direction, which is caused by a change in refractive index of a lens material due to an environmental variation in said device, by using a diffraction power change caused by a wavelength variation in said light source means.

17. A device according to claim 9, wherein said diffraction grating is formed on at least one surface of said optical element having the asymmetrically shaped optical surface.

18. A device according to claim 9, wherein said optical element on which said diffraction grating is formed is made of a plastic material.

19. A device according to claim 10, 11 or 12, wherein the reference axis is an optical axis.

20. A device according to claim 9, wherein said scanning optical device is used for an image forming apparatus for forming an image by using a deflected/scanned light beam.

* * * * *